United States Patent [19]

Izumi et al.

[11] 4,422,743

[45] Dec. 27, 1983

[54] EXPOSURE SYSTEM FOR A CAMERA

[75] Inventors: Tatsuro Izumi; Nobuyuki Taniguchi, both of Sakai; Toshiaki Matsumoto, Izumisano; Masatake Niwa, Sakai; Tokuji Ishida, Daito; Masatoshi Itoh, Sakai, all of Japan

[73] Assignee: Minolta Camera Kabushiki Kaisha, Osaka, Japan

[21] Appl. No.: 245,688

[22] Filed: Mar. 19, 1981

[30] Foreign Application Priority Data

Mar. 19, 1980 [JP] Japan ................................ 55-35540

[51] Int. Cl.³ ............................................ G03B 15/05
[52] U.S. Cl. .................................. 354/415; 354/416; 354/420; 354/480
[58] Field of Search ...................... 354/230, 27, 32–35, 354/36, 38, 60 F, 132, 133, 137, 138, 139, 140, 141, 145, 149, 43, 44, 136, 147; 315/241 P, 151, 158; 250/205; 355/38, 68, 69

[56] References Cited

U.S. PATENT DOCUMENTS

| 3,465,656 | 9/1969 | Wick et al. ...................... 315/241 P |
| 3,626,246 | 12/1971 | Higuchi ........................... 315/151 X |
| 3,716,752 | 2/1973 | Iwata ............................. 354/145 X |
| 3,846,811 | 11/1974 | Nakamura et al. ................... 354/33 |
| 3,998,534 | 12/1976 | Schulze et al. ...................... 354/33 |
| 4,117,375 | 9/1978 | Bachur et al. .................. 315/158 X |
| 4,167,313 | 9/1979 | Tsunefuji ............................. 354/38 |
| 4,256,995 | 3/1981 | Ishida .............................. 354/33 X |

Primary Examiner—William B. Perkey
Attorney, Agent, or Firm—Wenderoth, Lind & Ponack

[57] ABSTRACT

An exposure system for a camera includes a light emitting apparatus for emitting an artificial light toward an object. The light emitting apparatus is capable of selectively emitting a first type of light which flashes instantaneously, and a second type of light which flashes for a prolonged period of time. The intensity is maintained constant during the prolonged period of time. A camera produces a mode signal for switching the light emitting apparatus between a first mode in which the instantaneous flash light is emitted and a second mode in which the prolonged flash light is emitted.

33 Claims, 24 Drawing Figures

| Fig. 6a | Fig. 6b |

EXPOSURE SYSTEM FOR A CAMERA

BACKGROUND OF THE INVENTION

The present invention relates to an exposure system for use in a camera provided with an auxiliary light for carrying out proper photographying and, more particularly, to an exposure system which has a much greater choice of combinations of the shutter speed and mode of flash light produced from the auxiliary light than the conventional exposure system.

When taking a photograph in a dark place, it has been a common practice to use the auxiliary light emitted from a light emitting apparatus, such as a strobe in combination with the ambient light. According to the conventional light emitting apparatus, the flash light produced therefrom lasts only several hundred microseconds. Therefore, for the focal plane shutter type camera, the flash light from the light emitting apparatus can be used only for a shutter speed slower than the synchronizing shutter speed (for example, 1/125 sec.). Thus, according to the conventional exposure system, particularly for the focal plane shutter type camera, no photographing operation in combination with the flash light is available for shutter speeds which are faster than the synchronizing shutter speed.

SUMMARY OF THE INVENTION

Accordingly, it is a primary object of the present invention to provide an exposure system which makes it possible to take a photograph in combination with the flash light at a shutter speed which is faster than the synchronizing shutter speed.

It is another object of the present invention to provide an exposure system of the above described type employing a light emitting apparatus which can selectively produce a first type of flash light which lasts for a short period of time with a high intensity of light and a second type of flash light which lasts for a comparatively long period of time with a low intensity of light.

In accomplishing these and other objects, an exposure system for a camera according to the present invention comprises means for projecting an artificial light towards an object. The projecting means is capable of selectively projecting a first type of light which flashes instantaneously and a second type of light which flashes for a prolonged period of time. The intensity is maintained constant during the period of time. The exposure system further comprises means for receiving a first signal from the camera and means responsive to the first signal for switching the projecting means between a first mode to project the first type of light and a second mode to project the second type of light.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE PREFERRED EMBODIMENTS

Figure 1:
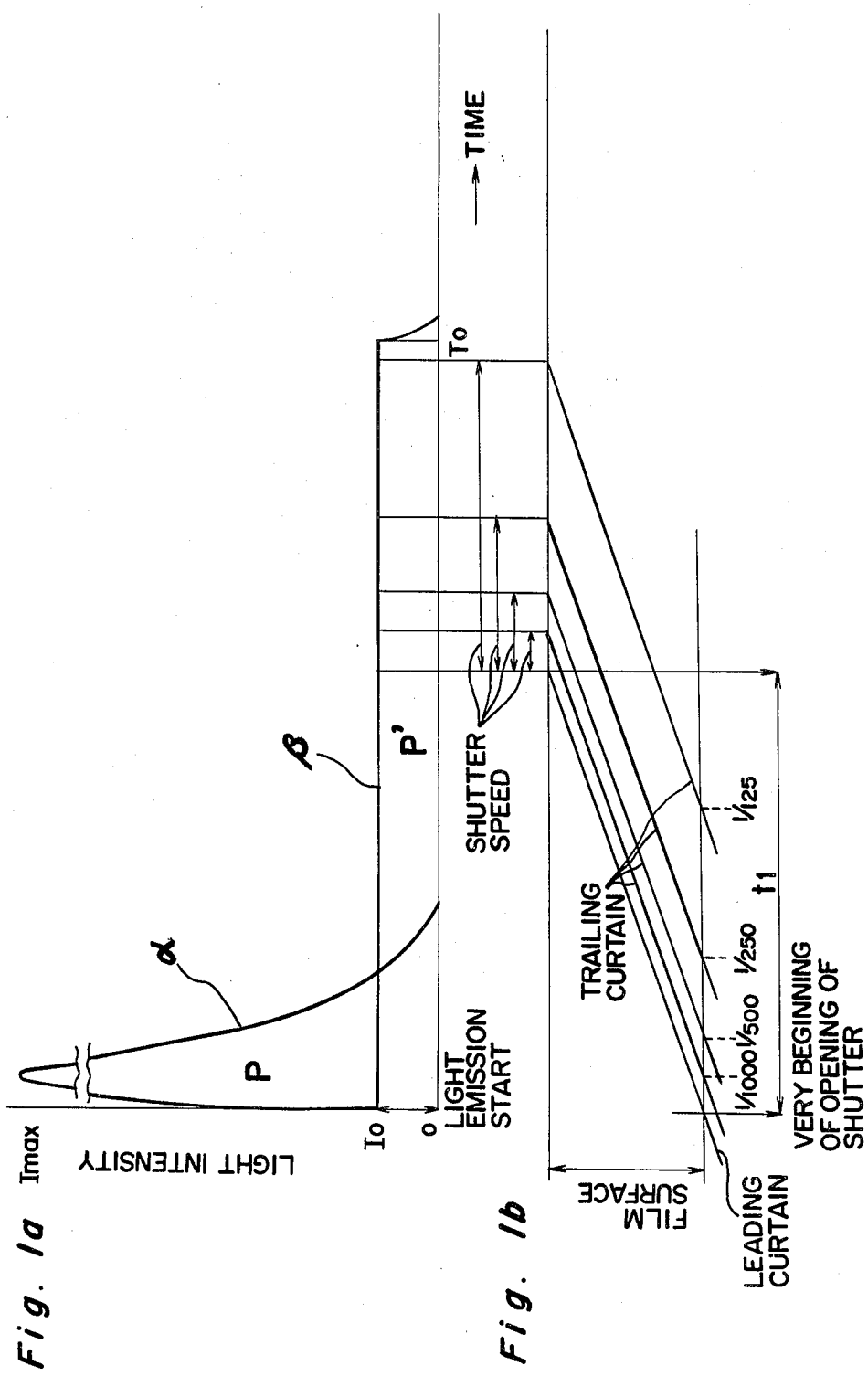
FIG. 1a is a graph showing waveforms of an instantaneous flash light and a prolonged flash light.
FIG. 1b is a graph showing the movement of the leading and trailing curtains of a shutter mechanism.

Referring to FIG. 1a, there are shown two waveforms α and β of the light intensity of flash lights, both lights being emitted from a light emitting apparatus which will be described later in connection with FIGS. 6a and 6b. The waveform α is obtained when an instantaneous flash light having a very short flashing period and a very high light intensity Imax is produced and the waveform β is obtained when a prolonged flash light having a considerably longer flashing period To and a considerably lower and constant light intensity Io is produced. It is to be noted that the time period To is set to be not less than a time period from the very beginning of the opening of a shutter mechanism to the complete closure of the same. For example, in the case of a focal plane shutter, the flashing period To starts from the moment when the leading curtain starts to move and ends at the moment when the trailing curtain completely closes, as shown in FIG. 1b. Therefore, the flashing period To is greater than the sum of a time period necessary for the leading curtain to move over the film surface and a time period for shutter speed which is shorter than the synchronizing shutter speed. If the flashing period To is shorter than such a sum, there will be an irregularity in the exposure. In FIG. 1a, reference characters P and P' represent total light amount produced from the light emitting apparatus for the instantaneous and prolonged flash flash lights, respectively, and the relationship therebetween is normally $P \geq P'$.

Figure 2:
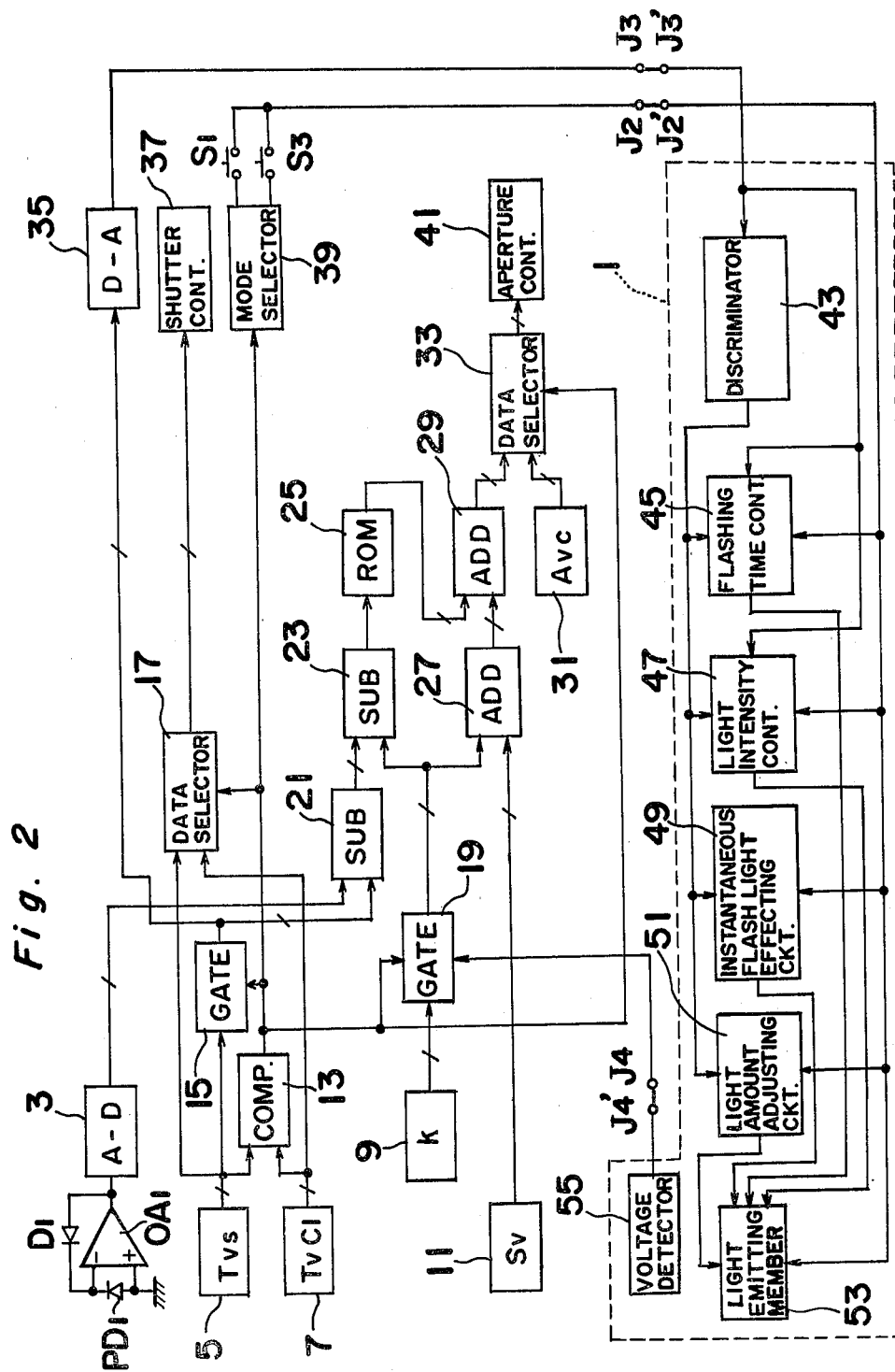
FIG. 2 is a block diagram showing an exposure system according to the first embodiment of the present invention, particularly designed for a shutter-speed-priority automatic exposure system.

Referring to FIG. 2, there is shown a block diagram according to the first embodiment of the exposure system of the present invention. In FIG. 2, a portion enclosed by a dotted line is included in the light emitting apparatus 1, and the remaining portion is included in a camera body. These two portions are adapted to be connectable to each other by terminals J2', J3' and J4' provided on the light emitting apparatus and corresponding terminals J2, J3 and J4 provided on the camera body. It is to be noted that a line extending between blocks which is provided with a virgule in FIGS. 2, 3 16 and 18 indicates a bundle of lines capable of transmitting a digital signal formed by a plurality of bits.

The portion of the camera side comprises a light receiving circuit for producing an analogue signal corresponding to the light intensity Bva of the ambient light. The light receiving circuit includes a light receiving element PD1, a diode D1 for effecting a logarithmic compression and an operational amplifier OA1. A reference numeral 3 designates an analogue-to-digital converter; 5 designates a shutter speed setting device and produces a signal Tvs corresponding to a set shutter speed; 7 designates a fixed shutter speed signal producing circuit for producing a signal Tvc1 corresponding to a synchronizing shutter speed (for example 1/125 second, and, for this case, Tvc1=7) for the emission of instantaneous flash light; 9 designates a light amount signal producing circuit for producing a signal k corresponding to the amount of light of the prolonged flash light to be produced from the light emitting apparatus; and 11 designates a film sensitivity or film speed setting circuit for producing a signal Sv corresponding to the film sensitivity.

A comparator 13 receives the signal Tvc1 from the fixed shutter speed producing circuit and also the signal Tvs from the shutter speed setting device 5 and compares these signals Tvc1 and Tvs. When Tvc1<Tvs, i.e., when the set shutter speed is faster than the synchronizing shutter speed, the comparator 13 produces a high level signal. On the other hand, when Tvc1≧Tvs, the comparator 13 produces a low level signal. A gate 15 connected to the comparator 13 opens its path when the comparator 13 produces the high level signal to allow the signal Tvs from the shutter speed setting circuit 5 to pass therethrough, and closes its path when the comparator 13 produces the low level signal to produce a signal "0". A data selector 17, connected to the shutter speed setting circuit 5 and the fixed shutter speed signal producing device 7, selects and produces the signal Tvs when the comparator 13 is producing the high level signal, and selects and produces the signal Tvc1 when the comparator 13 is producing the low level signal. The comparator 13 and a charged voltage detecting circuit 55, for detecting the charged voltage in a main capacitor (not shown) provided in the light emitting apparatus 1, are connected to a gate 19 which opens its path when the comparator 13 produces the high level signal and when the charged voltage detecting circuit 55 produces a high level signal, to produce the signal k obtained from the light amount signal producing circuit 9.

Reference numerals 21 and 23 designate subtractors; 25 designates a read only memory (ROM) for producing data corresponding to a signal obtained from the subtractor 23; 27 and 29 designate adders; 31 designates a fixed aperture value signal producing circuit for producing a signal Avc corresponding a proper aperture value for photographing with the instantaneous flash light; and 33 designates a data selector for selecting and producing a signal Avx (corresponding to an aperture value) obtained from the adder 29 when the comparator 13 produces the high level signal, and for selecting and producing the signal Avc obtained from the fixed aperture value signal producing circuit 31 when the comparator 13 produces the low level signal.

A reference numeral 35 designates a digital-to-analogue converter for converting the digital signal obtained from the gate 15 to an analogue signal; 37 designates a shutter control device for controlling the shutter mechanism by the signal obtained from the data selector 17; and 39 designates a mode selector circuit for selecting a prolonged flash light mode when the comparator 13 produces the high level signal, and for selecting an instantaneous flash light mode when the comparator 13 produces the low level signal. When the prolonged flash light mode is selected, a switch S1 is closed in response to the very beginning of opening of the shutter, for actuating the light emitting apparatus 1. On the other hand, when the instantaneous flash light mode is selected, a synchro-switch S3 is closed in response to the complete opening of the shutter for actuating the light emitting apparatus 1. A reference numeral 41 designates an aperture size control device for controlling the size of the aperture, or diaphragm, by the signal obtained from the data selector 33.

The portion of the exposure system in the light emitting apparatus 1 comprises a discriminator 43 connected to the digital-to-analogue converter 35 through the terminals J3 and J3' for determining whether the signal obtained from the digital-to-analogue converter 35 indicates the instantaneous or prolonged flash light mode. A reference number 45 designates a flashing time control circuit, actuated only when the discriminator 43 determines that the mode is the prolonged flash light mode, for controlling, by means of the signal obtained from the digital-to-analogue converter 35, the time duration in which the prolonged flash light is to be emitted; 47 designates a light intensity control circuit for controlling the light intensity by means of the signal obtained from the digital-to-analogue converter 35; 49 designates an instantaneous flash light effecting circuit for effecting the emission of instantaneous flash light; 51 designates a light amount adjusting circuit for controlling the amount of light to be produced for the instantaneous flash light; 53 designates a light emitting member; and 55 designates the charged voltage detecting circuit for detecting the voltage charged in the main capacitor of the light emitting apparatus and for producing a high level signal when the charged voltage in the main capacitor has reached a predetermined level.

The operation of the exposure system of FIG. 2 is explained below.

When the set shutter speed (Tvs) exceeds the fixed shutter speed (Tvc1), i.e., when Tvs>Tvc1, the comparator 13 produces a high level signal. In this case, the exposure system is arranged to be in the prolonged flash light mode as will be understood from the further description. The high level signal from the comparator 13 is applied to the gate 15 for allowing the set shutter speed signal Tvs to pass through the gate 15 to digital-to-analogue converter 35, in which the signal Tvs is converted from digital form to analogue form. The analogue signal Tvs is applied through the terminals J3 and J3' to the light emitting apparatus 1. In the light emitting apparatus 1, the analogue signal Tvs is applied to the determination 43 for the discrimination of the prolonged flash light mode and, in this mode, the flashing time control circuit 45 and light intensity control circuit 47 are made operative, and the instantaneous flash light effecting circuit 49 and the light amount adjusting circuit 51 are made inoperative.

The relationship between the flash light and the exposure condition is explained below from a theoretical point of view.

Assuming that the intensity of the light, as measured in front of the aperture, which has been emitted from the light emitting apparatus and reflected from the target object towards the camera (which light is referred to as reflected light) is $2^{Iv}$ and the flashing duration of the prolonged flash light is t, the quantity, or amount, of light $2^{Qvf}$ contained in the reflected light can be expressed as, $$2^{Qvf} = t \cdot 2^{Iv}. \tag{1}$$

In the case of the prolonged flash light mode, the prolonged flash light is emitted in response to the closure of the switch S1, effected at the very beginning of opening of the shutter, and continues to emit light during a period of time determined by the flashing time control circuit 45. Therefore, the equation (1) can be expressed as follows, $$2^{Qvf} = t1 \cdot 2^{Iv} + 2^{Iv-Tv}, \tag{2}$$

wherein t1 is a period of time between the very beginning of opening of the shutter and complete opening of the same effected by the leading curtain, and $2^{-Tv}$ is a film exposure time period, i.e., a period of time of delay of the trailing curtain with respect to the leading curtain. Thus, a time period t expressed as $$t = t1 + 2^{-Tv} \tag{3}$$

corresponds to a time period between the very beginning of opening of the shutter effected by the leading curtain and the completion of movement of the trailing curtain.

It is to be noted that the reflected light intensity $2^{Iv}$ is controlled so as to be a value corresponding to the shutter speed by the light intensity control circuit 47. This reflected light intensity $2^{Iv}$ can be expressed as $$2^{Iv} = 2^{Tv} \cdot 2^k \tag{4}$$

wherein k is a constant. Accordingly, from the equations (2) and (4), the amount of the total reflected light, as measured in front of the aperture, which has been produced from the light emitting apparatus during the prolonged flash light mode and reflected on the target object towards the camera can be expressed as $$2^{Qvf} = t1 \cdot 2^{Tv+k} + 2^k. \tag{5}$$

Accordingly, every section on one film frame will receive a constant light amount $2^k$ (referred to as an effective light amount), regardless of the shutter speed.

In the subtractor 21, the signal Bva obtained from the analog-to-digital converter 3 is reduced by an amount corresponding to the signal Tvs obtained from the gate 15. Thus, the subtractor 21 produces a signal Bva−Tvs. Then, in the subtractor 23, the signal Bva−Tvs obtained from the subtractor 21 is subtracted from the signal k obtained from the gate 19. Thus, the subtractor 23 produces a signal which can expresses as $$k - (Bva - Tvs) = \Delta'. \tag{6}$$

The signal $\Delta'$ produced from the subtractor 23 is used for specifying the address in the ROM 25, which thereupon produces a signal equal to $\log_2(1 + 2^{-\Delta'})$. In other words, the ROM 25 has a function of converting signal $\Delta'$ into a signal equal to $\log_2(1 + 2^{-\Delta'})$. The signal k obtained from the gate 19 and signal Sv obtained from the film sensitivity setting circuit are applied to the adder 27 which then produces a signal $(k+Sv)$. Then, in the adder 29, the signal $(k+Sv)$ from the adder 27 and the signal $\log_2(1+2^{-\Delta'})$ from the ROM 25 are added. Thus, the adder produces a signal Avx which is expressed as follows $$Avx = k + Sv + \log_2(1 + 2^{-\Delta'}). \tag{7}$$

The signal Avx given by the equation (7) corresponds to aperture value as understood from the following description. In general, when following parameters are given:

Tvs (set shutter speed); Bva (light intensity of the ambient light); Sv (film sensitivity); and k (effective light amount);

the aperture value Avx in question can be given as follows $$2^{Avx} = (2^{Bva-Tvs} + 2^k) \cdot 2^{Sv}. \tag{8}$$

when $\Delta'$ is defined as $$k - (Bva - Tvs) = \Delta', \tag{6}$$

the equation (8) can be expressed as $$2^k \cdot (1 + 2^{-\Delta'}) \cdot 2^{Sv} = 2^{Avx}. \tag{9}$$

By taking the logarithm with respect to the base 2, the equation (9) can be expressed as $$k + Sv + \log_2(1 + 2^{-\Delta'}) = Avx, \tag{7}$$

thus, obtaining the equation (7).

The signal Avx produced from the adder 29 is applied to the aperture value control device 41 for the control of the aperture size. The signal Tvs, indicative of the set shutter speed, is transmitted through the data selector 17 and is applied to the shutter control device 37 for the control of the shutter speed. By the mode selector 39, the switch S1, which closes in response to the very beginning of opening of the shutter, is so activated as to effect, when it is closed, the light emission of prolonged flash light from the light emitting member 53. The time duration and light intensity of the prolonged flash light are controlled by the flashing time control circuit 45 and light intensity control circuit 47, respectively, on the basis of the equation (5).

When the set shutter speed (Tvs) is equal to or below the fixed shutter speed (Tvc1), i.e., when Tvs≦Tvc1, the comparator 13 produces a low level signal for setting the exposure system in the instantaneous flash light mode. Thus, the gate 15 produces signal "0" and, therefore, the digital-to-analogue converter 35 produces signal "0" (ground level signal). Accordingly, the discriminator 43 determines that the mode is the instantaneous flash light mode and, in this mode, the instantaneous flash light effecting circuit 49 and the light amount adjusting circuit 51 are made operative, and the flashing time control circuit 45 and the light intensity control circuit 47 are made inoperative. Furthermore, from the data selector 17, the shutter speed signal Tvc1, which is indicative of the synchronizing shutter speed, is applied to the shutter control device 37, and from the data selector 33, the aperture value signal Avc, which is obtained from the fixed aperture value signal producing circuit 31 for producing the aperture value signal which is appropriate for instantaneous flash light photography, is applied to the aperture value control device 41.

Accordingly, in the instantaneous flash light mode, the aperture size is controlled by the signal Avc and the shutter speed is controlled by the signal Tvc1. Furthermore, in this mode, the mode selector 39 operates such that the switch S3, which closes in response to the complete opening of the shutter and is coupled to the synchro-terminal X, is activated, so that when the switch S3 is closed, the instantaneous flash light, which is controlled by the instantaneous flash light effecting circuit 49, is emitted from the light emitting member 53. When the emitted flash light that has been reflected from the target object and received by the light amount adjusting circuit 51 reaches a predetermined level, the light emitting member 53 stops producing the instantaneous flash light in a manner similar to that carried out in the conventional auto-strobo exposure system.

Figure 3:
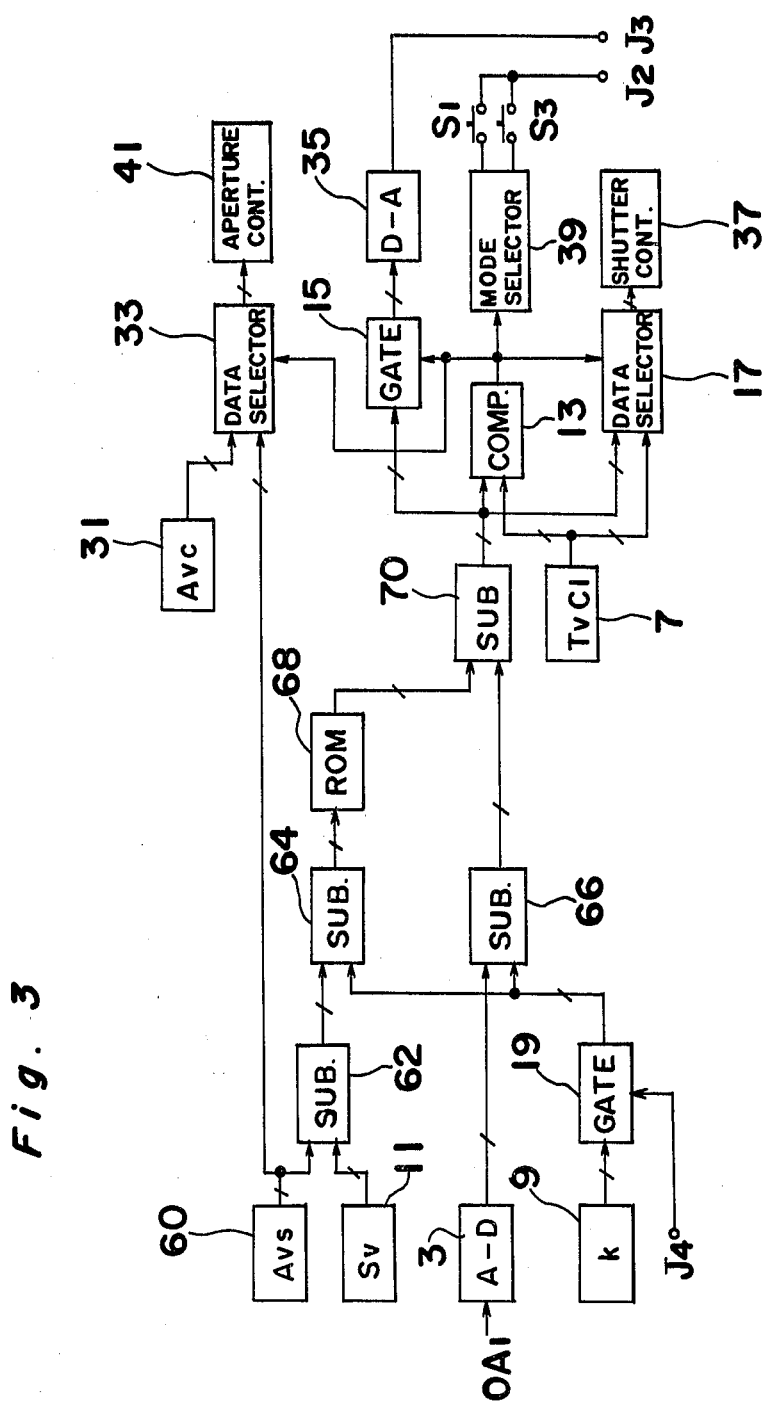
FIG. 3 is a block diagram showing an exposure system according to the first embodiment of the present invention, particularly designed for an aperture-priority automatic exposure system.

Referring to FIG. 3, there is shown a block diagram of an exposure system which is a modification of that shown in FIG. 2. The exposure system of FIG. 2 is a type which automatically sets the aperture size on the basis of a selected shutter speed (generally referred to as a shutter-speed-priority automatic exposure system or a shutter-speed-preferred automatic exposure system), whereas the exposure system of FIG. 3 is a type which automatically set the shutter speed on the basis of a selected aperture value (generally referred to as an aperture-priority automatic exposure system or an aperture-preferred automatic exposure system). In FIG. 3, parts which are identical with the parts shown in FIG. 2 are designated by the same reference numerals, and since the light receiving circuit and light emitting apparatus 1 have the same structure as those described above in connection with FIG. 2, they are omitted for the sake of brevity. A reference numeral 60 designates an aperture value setting circuit; each of reference numerals 62, 64, 66 and 70 designates a subtractor; and a reference numeral 68 designates a read-only-memory (ROM) serving as a signal converter.

The subtractor 62 receives an aperture signal Avs set up in the aperture value setting circuit 60 and a film sensitivity signal Sv set up in the film sensitivity setting circuit 11 for calculating a difference (Avs-Sv) which is applied to the subtractor 64. In the subtractor 64, the difference (Avs-Sv) is reduced by an amount corresponding to a signal k, corresponding to the effective amount of light of prolonged flash light and obtained from the gate 19 so that the subtractor 64 produces a signal Δ which can be expressed as $$(Avs - Sv) - k = \Delta. \tag{10}$$

In the meantime, the subtractor 66 receives signal Bva, corresponding to the light intensity of the ambient light, and obtained from the analogue-to-digital converter 3 and the signal k obtained from the gate 19 for calculating and producing a difference (Bva−k) which is applied to the subtractor 70. The subtractor 70 also receives signal from the ROM 68. In the ROM 68, the signal Δ obtained from the subtractor 64 is used for addressing and producing a signal corresponding to $\log_2 (2^\Delta - 1)$. In other words, the signal Δ is converted into a signal equal to $\log_2 (2^\Delta - 1)$ in the ROM 68. Accordingly, in the subtractor 70, the signal (Bva−k) is reduced by an amount equal to $\log_2 (2^\Delta - 1)$ and, thus, the subtractor 70 produces a signal which can be expressed as $$Tvx = (Bva - k) - \log_2 (2^\Delta - 1). \tag{11}$$

The comparator 13 receives the signal Tvx indicative of calculated shutter speed and obtained from the subtractor 70 and receives the signal Tvc1 indicative of the synchronizing shutter speed and obtained from the fixed shutter speed setting device 7; the comparator 13 then compares these two signals. When Tvx>Tvc1, the comparator 13 produces a high level signal which is applied to the of data selector 33, the gate 15, the mode selector 39 and the data selector 17. Accordingly, the data selector 33 selects the aperture signal Avs obtained from the aperture value setting circuit 60 for effecting the control of the aperture size as carried out by the aperture size control control device 41, and the data selector 17 selects the calculated shutter speed signal Tvx obtained from the subtractor 70 for effecting the control of the shutter speed as carried out by the shutter control device 37. Furthermore, the gate 15 is opened to supply the calculated shutter speed signal Tvx, which is then converted into an analogue signal in the digital-to-analogue converter 35, to the light emitting apparatus 1, and the mode selector 39 is so actuated as to activate the switch S1 so as to emit the prolonged flash light when the switch S1 is closed. On the contrary, when Tvx≦Tvc1, the comparator 13 produces a low level signal, the data selector 33 supplies the fixed aperture signal Avc to the aperture size control device 41, and the data selector 17 supplies the fixed shutter speed signal Tvc1, while the mode selector 39 selects the instantaneous flash light mode for carrying out photography with the instantaneous flash light.

It is to be noted that the signal Tvx given by the equation (11) corresponds to the shutter speed as understood from the following description. Since the equation (8) can be modified as $$(2^{Bva-Tvx} + 2^k) \cdot 2^{Sv} = 2^{Avs}, \tag{8-1}$$

this can be further modified as $$2^{Bva-Tvx} + 2^k = 2^{Avs-Sv}. \tag{8-2}$$

When Δ is defined as $$(Avs - Sv) - k = \Delta, \tag{10}$$

the equation (8-2) can be expressed as $$2^{Bva-Tvx}=2^k\cdot(2^\Delta-1). \tag{12}$$

By taking the logarithm with respect to the base 2, the equation (12) can be expressed as $$Bva-Tvx=k+\log_2(2^\Delta-1) \tag{11'}$$

which is substantially identical with the equation (11).

Figure 4:
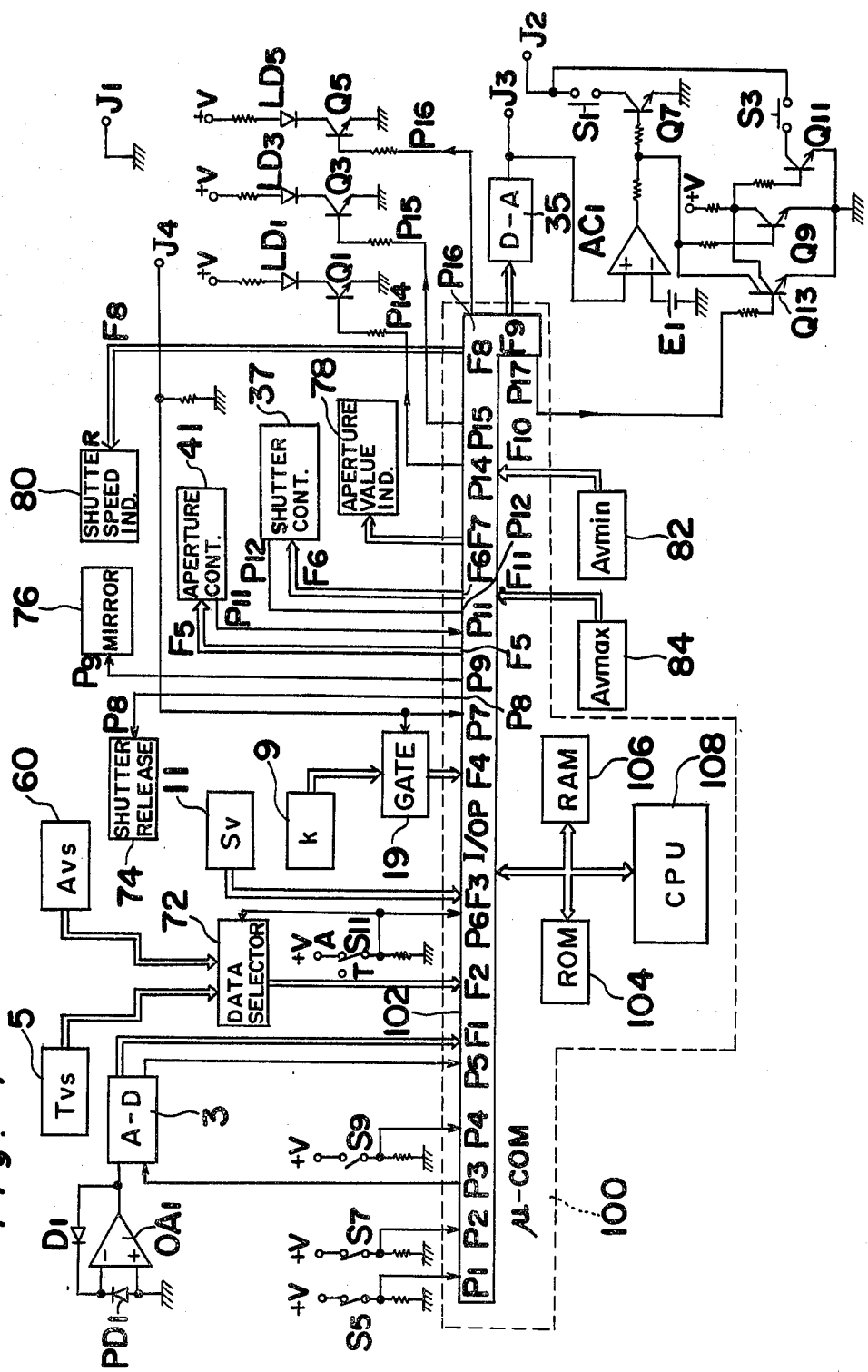
FIG. 4 is a circuit diagram showing an exposure system according to the first embodiment of the present invention designed for carrying out control selectively under a shutter-speed-priority automatic exposure system and an aperture-priority automatic exposure system.
Figure 5A:
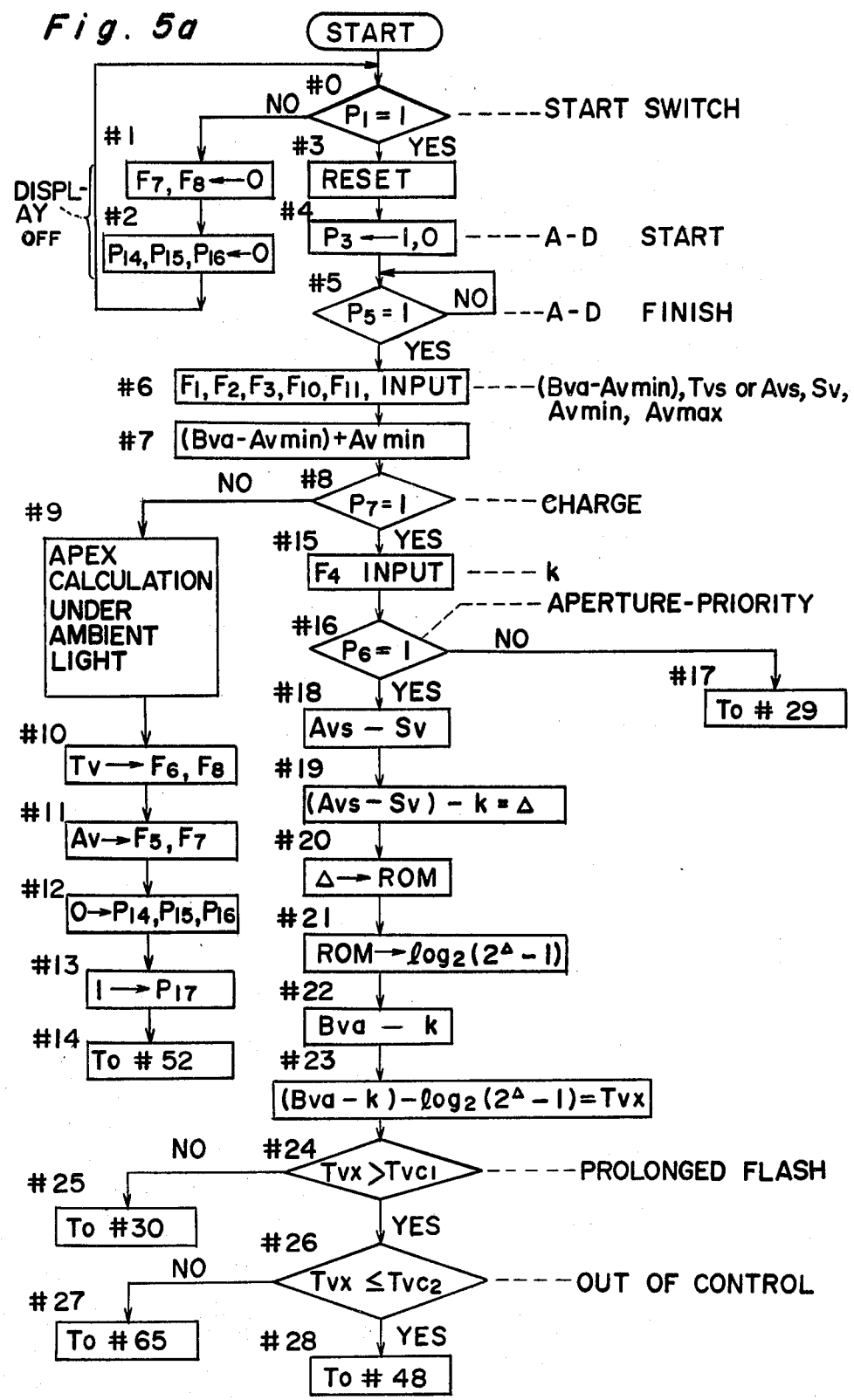
FIGS. 5a to 5e are flow charts showing the operation carried out in the exposure system of FIG. 4.
Figure 5B:
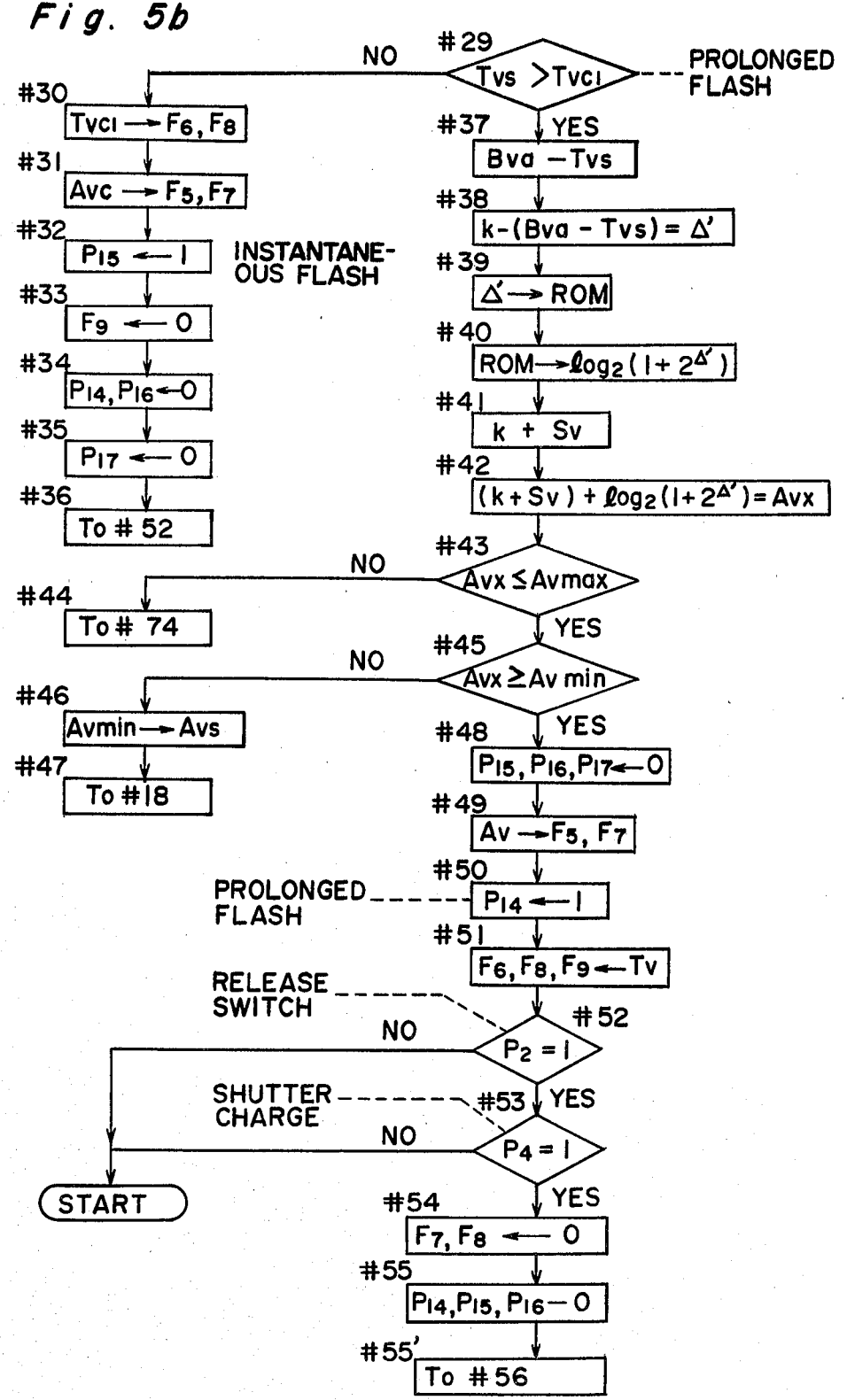
Figure 5C:
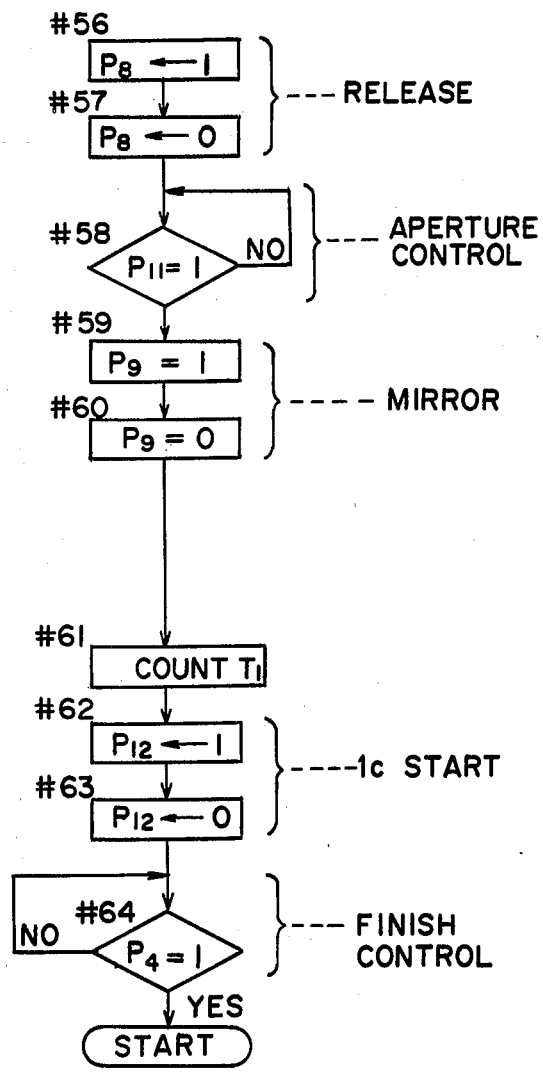
Figure 5D:
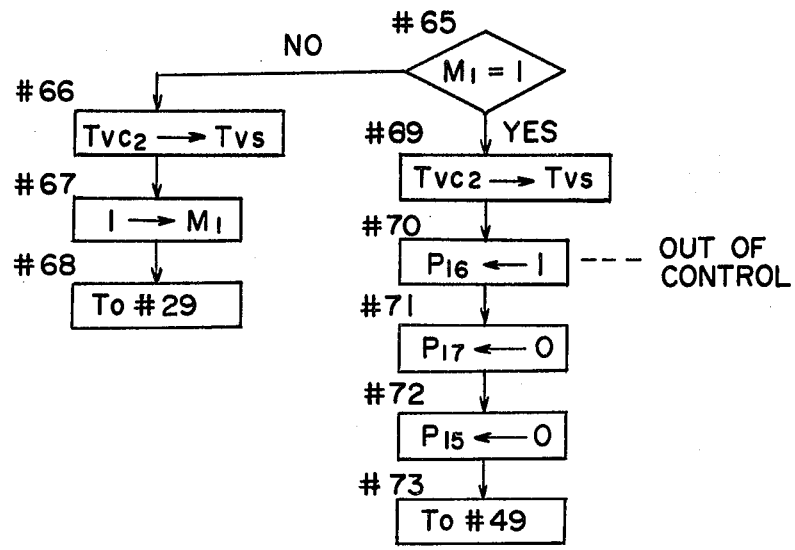
Figure 5E:
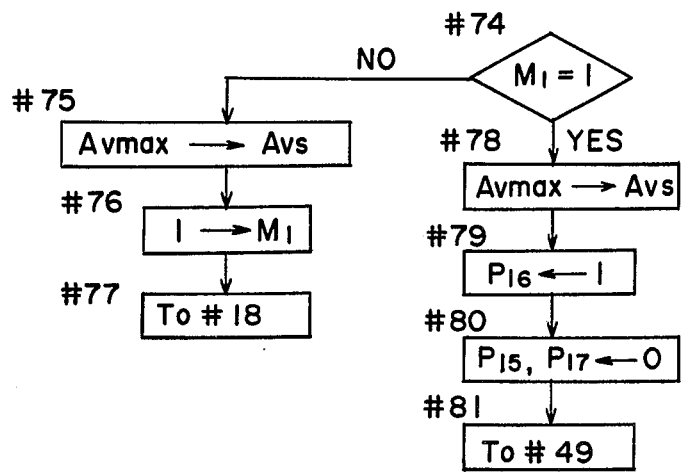

Referring to FIG. 4, there is shown a block diagram of the exposure system provided in the camera side in association with a microcomputer, according to the first embodiment of the present invention. The exposure system of FIG. 4 includes both systems comprising the shutter-speed-priority automatic exposure system described above in connection with FIG. 2 and the aperture-priority automatic exposure system described above in connection with FIG. 3. In FIG. 4, parts which are identical with the parts shown in FIG. 2 or 3 are designated by the same reference numerals. A reference character S5 designates a main switch for turning on the microcomputer and is preferably provided operatively in association with a shutter release button (not shown) so that it may close when the shutter release button, which is a two-step button, is depressed halfway; and S7 designates a switch which produces a signal that commands the start of the shutter release and is provided operatively in association with the shutter release button so that it may close when the shutter release button is depressed all the way. A reference character S9 designates a switch which is closed when the exposure control system completes its operation and is opened in response to the shutter charge. A reference numeral 72 designates a data selector provided in association with a switch 11. When the switch 11 is turned to a terminal A (aperture-priority automatic exposure system), the data selector 72 supplies signal from the aperture value setting circuit 60 to an input port F2 of an input and output (I/O) unit 102, and when the switch 11 is turned to a terminal T (shutter-speed-priority automatic exposure system), the data selector 72 supplies signal from the shutter speed setting circuit 5 to the input port F2. A reference numeral 74 designates a magnet circuit for effecting the shutter release; 76 designates a magnet circuit for allowing the mirror to flip up; 78 designates a aperture value indicator; and 80 designates a shutter speed indicator. A light emitting diode LD1 is provided for the indication, when it is lit, of the prolonged flash light mode, and a light emitting diode LD3 is provided for the indication, when it is lit, of the instantaneous flash light mode. A light emitting diode LD5 is provided for the indication, when it is lit, of out of control due to the fact that the calculated shutter speed or aperture value is beyond the controllable range in the prolonged flash light photography mode.

Reference numerals 82 and 84 each designate an aperture signal producing circuit; circuit 82 produces a signal Avmin indicative of the minimum aperture value, i.e., corresponding to the maximum available aperture size; and circuit 84 produces a signal Avmax indicative of the maximum aperture value, i.e., corresponding to the stopped down or minimum available aperture size. Enclosed by a dotted line in FIG. 4 is a microcomputer 100 for controlling the light measuring, calculation and exposure, and it includes the input and output (I/O) unit 102 provided for the data transfer between the microcomputer 100 and the externally provided circuits, a read-only-memory (ROM) 104 having fixed data and instruction data stored therein for controlling the operation of microcomputer 100, a random-access-memory (RAM) 106 for temporarily storing various data, and a central-processing-unit (CPU) 108. The operation of the exposure system of FIG. 4 will be described below with reference to the flow chart of the microcomputer 100 shown in FIGS. 5a, 5b, 5c, 5d and 5e.

In the initial condition, the main switch S5 is opened for maintaining the microcomputer 100 in the inactive condition. In this condition, an input terminal P1 of I/O unit 102 receives a low level signal and thus, output ports F7 and F8 produce a binary coded signal of a zero value and output terminals P14, P15 and P16 produce a low level signal for effecting no indication. When the shutter release button (not shown) is depressed halfway to close the main switch S5, the input terminal P1 receives a high level signal to reset the microcomputer 100. Immediately thereafter, a pulse is produced from an output terminal P3 for starting the actuating of the analogue-to-digital converter 3. When the converter 3 completes its operation, it produces a high level signal which is applied to an input terminal P5. In response to the receipt of a high level signal at the input terminal P5, the microcomputer 100 is so actuated as to receive various data. Specifically, it receives: signal (Bva−Avmin), indicative of the measured light amount with the aperture being opened to its maximum size, and output from the analogue-to-digital converter 3 to input port F1; signal Tvs or Avs, output from the data selector 72, which receives these signals Tvs and Avs from the shutter speed setting circuit 5 and the aperture value setting circuit 60 and selectively output one of either of the signals Tvs or Avs to input port F2; signal Sv, output from the film sensitivity setting circuit 11 to input port F3; aperture signal Avmin, output from the maximum aperture size signal producing circuit 82 to input port F10; and aperture signal Avmax from the minimum aperture size signal producing circuit 84 to input port F11. When these signals are received, the microcomputer 100 subtracts aperture signal Avmin from the signal Bva−Avmin for obtaining signal Bva.

Thereafter, in the microcomputer 100, it is determined whether or not a high level signal, indicative of completion of the charging of the main capacitor in the light emitting member, has been provided to input terminal P7 through the terminal J4. When the terminal P7 is receiving a low level signal, the microcomputer 100 is so informed as to carry out photography without any flash light. In this case, the procedure advances to step 9 for carrying out the usual APEX calculation to produce a shutter speed signal Tv from output ports F6 and F8, and also to produce an aperture value signal Av, which signals Tv and Av are used for the control. Specifically, the shutter speed signal Tv produced from each of the output ports F6 and F8 is applied, respectively, to the shutter control circuit 37 and the shutter speed indicator 80, and the aperture value signal Av produced from each of output ports F5 and F7 is applied, respectively, to the aperture control circuit 41 and the aperture value indicator 78. In the step 12, output terminals P14, P15 and P16 are set to produce a low level signal so as to prevent the light emitting diodes LD1, LD2 and LD3 from being lit, and in the step 13, output terminal P17 is set to produce a high level signal for causing a transistor Q13 to conduct, thereby maintaining transistors Q7 and Q11 in their nonconductive state. Accordingly, the switches S1 and S3 are prevented from being activated. In other words, the switches S1 and S3 are maintained in a disconnected condition with respect to ground, so that the closure of the switches S1 or S3 provides no ground or low level signal to the junction J2. Accordingly, the light emitting apparatus will not produce any flash light by the closure of the switches S1 or S3. Thereafter, the procedure advances to step 52 for the shutter release operation which will be described in detail later. In the meantime, a further calculation is carried out in the microcomputer 100 for the control of photography with flash light, is described.

When the terminal P7 receives a high level signal, the microcomputer 100 is so informed as to carry out photography with the use of flash light. In this case, the procedure advances from step 8 to step 15. In the step 15, the signal k, corresponding to the effective light amount under the prolonged flash light, is applied to input port F4 from the light amount signal producing circuit 9 through the gate 19. Then, in the step 16, it is determined whether or not terminal P6 is receiving a high level signal, i.e., whether or not the switch S11 is turned to the terminal A for selecting the aperture-priority automatic exposure system. When the terminal P6 is receiving a high level signal, the procedure advances to the step 18, and when the terminal P6 is receiving a low level signal, the procedure advances to the step 29. First, the case when the procedure advances to the step 18 is described.

In the step 18, signal Avs from the data selector 72 and signal Sv from the film sensitivity setting circuit 11 are used for carrying out a calculation of Avs−Sv. Then, the data Avs−Sv, as calculated is reduced by an amount equal to the signal k obtained from the gate 19 to obtain data Δ. Thus, the microcomputer carries out the following calculation:

$$(Avs-Sv)-k=\Delta \tag{10}$$

The obtained data Δ is used for addressing the ROM 104 so that the ROM 104 produces data equal $\log_2 (2^\Delta-1)$ which has been stored in a location of ROM 104 specified by the address data Δ. Then, the data $\log_2 (2^\Delta-1)$ is transmitted to the CPU 108. In the step 22, data Bva of the ambient light intensity and data k of the effective light amount are used for the calculation Bva−k and, in the step 23, $$Tvx=(Bva-k)-\log_2 (2^\Delta-1) \tag{11}$$

is carried out for obtaining data equal to Tvx of the shutter speed.

In the step 24, it is determined whether or not the shutter speed data Tvx is greater than the data Tvc1 of the synchronizing shutter speed. When it is determined that Tvx≦Tvc1 (in this case, the shutter speed controlled by the data Tvx will be equal to or slower than that controlled by the data Tvc1), the procedure advances to the step 25 and further to the step 30 for carrying out the photography operation in the instantaneous flash light mode, as will be described later. On the other hand, when it is determined that Tvx>Tvc1 (in this case, the shutter speed controlled by the data Tvx will be faster than that controlled by the data Tvc1), it is further determined in the step 26 whether the calculated data Tvx is smaller than the given data Tvc2 corresponding to the fastest available shutter speed, for example 1/1000 sec. When Tvx≦Tvc2, the procedure advances to the step 48, and when Tvx>Tvc2, the procedure advances to the step 65.

In the step 65, it is determined whether or not a register M1 provided in the RAM 106 is storing a "1". When it is not storing a "1", the fixed data Tvc2 is selected for the control of shutter speed in the step 66, and thereafter, a "1" is set up in the register M1. Then, the procedure advances to the step 29 from which the exposure control under the shutter-speed priority automatic exposure system starts. When the register M1 is storing a "1" in the step 65, the procedure advances to the step 69. Since this step 69 corresponds to a case wherein the shutter speed is calculated with the use of the maximum available aperture value Avmax as a substitute for the calculated aperture value Avx which is greater than the maximum available aperture value Avmax, the film will be over-exposed, even if the shutter speed is set to its fastest value using the data Tvc2. Therefore, in this case, the data Tvc2 is used and, at the same time, a high level signal is produced from the terminal P16 for lighting the light emitting diode LD1, thus giving out a warning of over-exposure. The terminals P15 and P17 are set to produce a low level signal, and then, the procedure advances to step 49. In the above case, although the prolonged flash light photography operation can be carried out with the shutter speed being controlled by the data Tvc2, and the aperture being controlled by the data Avmax, the film will be over-exposed.

In the step 29, it is determined whether the signal Tvs of set shutter speed is greater than the given data Tvc1 of the synchronizing shutter speed. When Tvs≦Tvc1, the procedure advances to the instantaneous flash light mode control that starts from the step 30. In the step 30, the data Tvc1 is supplied to the shutter control device 37 and the shutter speed indicator 80 through output ports F6 and F8, respectively, and in the step 31, fixed data Avc corresponding to the aperture value appropriate for the auto-strobo photography is supplied to the aperture size control device 41 and the aperture value indicator 78 through output ports F5 and F7, respectively. Then, in the step 32, a high level signal is produced from terminal P15 for lighting the light emitting diode LD3 for the indication of the instantaneous flash light mode. Then, a signal "0" is produced from output port F9 so that the digital-to-analogue converter 35 produces a ground level signal which is applied through the terminal J3 to the light emitting apparatus, indicating that the selected mode is the instantaneous flash light mode. The ground level signal from the digital-to-analogue converter 35 is also applied to the comparator AC1 which accordingly produces a low level signal to render the transistors Q7 and Q9 non-conductive, and to render the transistor Q11 conductive. Accordingly, when the switch S3, which is coupled with the synchro-terminal X, is closed, a ground level signal is applied through the terminal J2 to the light emitting apparatus to produce the instantaneous flash light. Thereafter, the terminals P14, P16 and P17 produce a low level signal for stopping the light emission from the light emitting diodes LD1 and LD5, and also for rendering the transistor Q13 non-conductive. Thereafter, the procedure proceeds to step 52 et seq.

In the step 29, when Tvs>Tvc1, the procedure advances to step 37 for the prolonged flash light mode operation under the shutter-speed-priority automatic exposure system. In the step 37, Bva−Tvs is calculated, and then, $$k - (Bva - Tvs) = \Delta' \qquad (6)$$

is calculated. The obtained data $\Delta'$ is used for addressing the ROM 104 which accordingly produces data equal to $\log_2(1+2^{\Delta'})$ which has been stored in the ROM 104 at a location specified by the address data $\Delta'$. The data $\log_2(1+2^{\Delta'})$ is applied to the CPU 108. Then, $(Sv+k)$ is calculated and further $$(k+Sv) + \log_2(1+2^{\Delta'}) = Avx \qquad (7)$$

is calculated for producing the aperture data Avx.

In the step 43, it is determined whether the calculated aperture data Avx is smaller than the maximum aperture value Avmax. When Avx>Avmax, the procedure proceeds to step 74 et seq.

In the step 74, it is determined whether or not the register M1 employed in the RAM 106 is storing a "1". If not, the set aperture value Avs is replaced by the maximum aperture value Avmax, and then, a "1" is set up in the register M1. Thereafter, the procedure continues from the step 18 to carry out the control under the aperture-priority automatic exposure system. On the other hand, when it is determined in the step 74 that the register M1 is storing a "1", the condition is such that the shutter speed data Tvx, which has been calculated in the procedure of the aperture-priority automatic exposure system is greater than the fixed shutter speed data Tvmax (Tvx>Tvmax), and the aperture value data Avx, which has been calculated in the procedure of the shutter-speed-priority automatic exposure system using the fixed shutter speed data Tvmax, is greater than the fixed aperture data Avmax (Avx>Avmax). This condition is similar to that described above for the procedure proceeding from the step 65. Accordingly, the photography will result in over-exposure, even if the shutter speed is set to its fastest (Tvmax) value and the aperture size is stopped down to its minimum size (Avmax). In this case, Avmax is set up in the step 78 and, a high level signal is produced from the terminal P16 for lighting the light emitting diode LD1, thus giving out a warning of over-exposure. The terminal P15 and P17 are set to produce a low level signal for turning off the light emitting diode LD3 and for rendering the transistor Q13 non-conductive. Thereafter, the procedure advances to step 49. In the above case, although the prolonged flash light photography operation can be carried out with the shutter speed being controlled by the data Tvmax and the aperture being controlled by the data Avmax, the film will be over-exposed.

In the step 45, it is determined whether or not the calculated aperture value Avx is smaller than the fixed aperture value Avmin (corresponding to the fully open aperture value). When Avx<Avmin, the set aperture value Avs is replaced with Avmin and then, the procedure proceeds from the step 18 for the calculation for the operation under the aperture-priority automatic exposure system.

On the contrary, when it is determined in the step 45 that Avx≧Avmin, the procedure advances to the step 48 for the control of the photography operation in prolonged flash light mode. It is to be noted that the procedure that starts from the step 48 may follow after the step 28. In the step 48, a low level signal is produced from each of the terminals P15, P16 and P17 for turning off the light emitting diodes LD3 and LD5 and also for rendering the transistor Q13 non-conductive. Thereafter, the procedure advances to step 49 which may also be initiated subsequent to either the step 73 or 81. In the step 49, the aperture value Av for the control is supplied through the output ports F5 and F7 to the aperture control device 41 and the aperture indicator 78, respectively. In the step 50, a high level signal is produced from the terminal P14 for lighting the light emitting diode LD1 indicating that the selected mode is prolonged flash light mode. Then, in the step 51, the shutter speed value Tv for the control is produced from the output ports F6, F8 and F9 for the supply of the shutter speed Tv to the shutter speed indicator 80, the shutter control device 37 and the digital-to-analogue converter 35. Accordingly, the output voltage from the digital-to-analogue converter 35 corresponds to the voltage indicative of the shutter speed Tv. Since this voltage is higher than the constant voltage E1, the comparator AC1 produces a high level signal so that transistors Q7 and Q9 are rendered conductive and transistor Q11 is rendered non-conductive. The turning of these transistors Q7, Q9 and Q11 to their respective states is supported by the non-conductive state of the transistor Q13. Thereafter, when the switch S1 is closed in response to the very beginning of opening of the shutter, the light emitting apparatus is actuated to emit a prolonged flash light.

In the step 52, it is determined whether or not the terminal P2 is receiving a high level signal. When the terminal P2 is receiving a low level signal due to the opening of the switch S7, the procedure returns back to start for carrying out again the operations of light measuring, calculation and display. When the terminal P2 is receiving a high level signal, the procedure proceeds to the step 53 for the determination whether the terminal P4 is receiving a low level signal. When the terminal P4 is receiving a high level signal, due to the closure of switch S9 effected when the shutter is not charged, the procedure returns back to start for carrying out again the operations of light measuring, calculation and display. When the terminal P4 is receiving a low level signal, it is informed that the shutter is charged. In this case, the procedure advances to step 54 for producing a "0" from output ports F7 and F8 for turning off the indicators 78 and 80. Then, in the step 55, a low level signal is produced from the terminals P14, P15 and P16 for turning off the light emitting diodes LD1, LD3 and LD5. Thereafter, the exposure is controlled in the step 56 et seq.

In the steps 56 and 57, a pulse is produced from a terminal P8 for actuating the magnet circuit 74 for effecting the exposure control which is initiated by the control of the aperture size. The aperture size control device 41 compares the varying signal, obtained relative to the actual stop down and the aperture signal Av obtained from the output port F5, and produces a signal when the varying signal matches with the aperture signal Av for stopping the further stopping down operation of the aperture. When the aperture control is completed, the terminal P11 receives a high level signal which initiates the steps 59 and 60 for producing a pulse from the terminal P9 which is fed to the magnet circuit 76 for allowing the mirror to flip up. After counting a time T1 necessary for the mirror-up condition to be reached, the terminal P12 produces a pulse which actuates the shutter control device 37. Accordingly, the leading curtain of the shutter mechanism starts to scan and, at the same time, the shutter speed counter 37 starts to count a shutter opening time using the data Tv obtained from the output port F6. Thereafter, in the case of the prolonged flash light mode, the light emitting apparatus produces a prolonged flash light in response to the closure of the switch S1 effected when the leading curtain starts to open the shutter and, in the case of the instantaneous flash light mode, the light emitting apparatus produces an instantaneous flash light in response to the closure of the synchro-switch S3 effected when the leading curtain completes its scan across the film frame. Then, when the counter 37 finishes counting the shutter opening time, the training curtain starts to scan across the film frame. When the trailing curtain finishes its scan, the mirror, which has been flipped up, pivots down and the aperture opens to its full size. Furthermore, the completion of scan of the trailing curtain closes the switch S9. Thus, a high level signal is applied to the terminal P4 for setting the microcomputer 100 to its initial condition.

Figures 6, 6B:
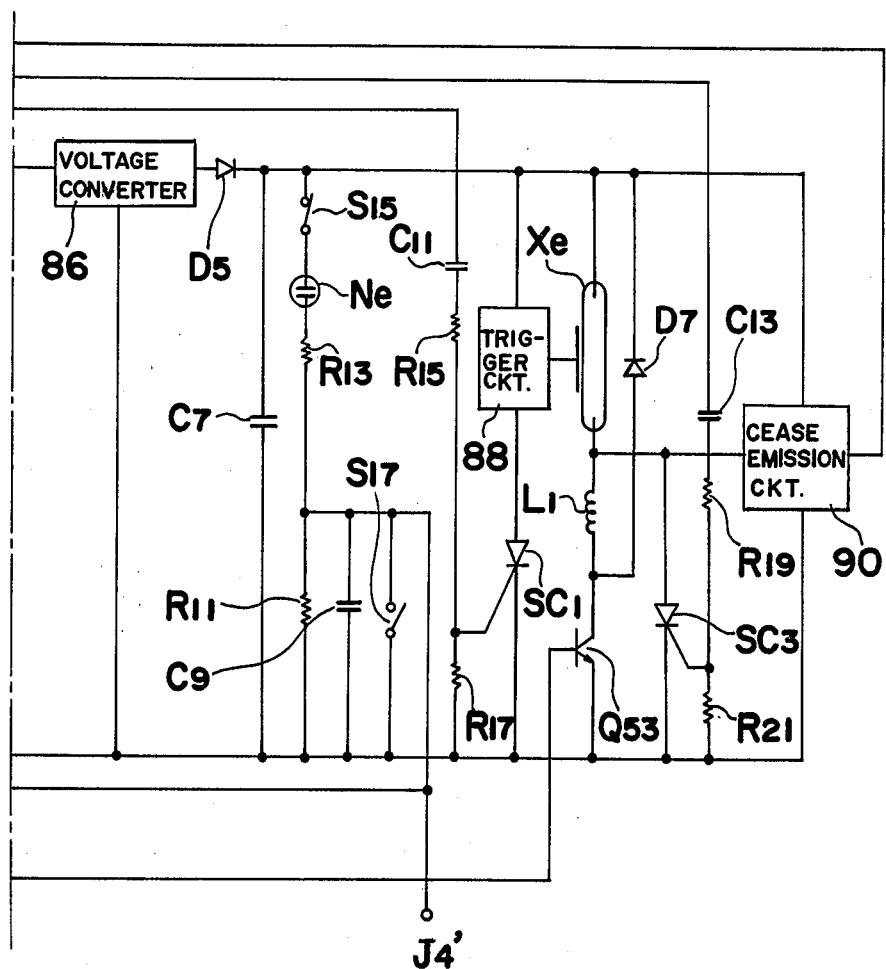
FIGS. 6a and 6b taken together as shown in FIG. 6 show a circuit diagram of a light emitting apparatus for use in the exposure system of the present invention.
Figure 6A:
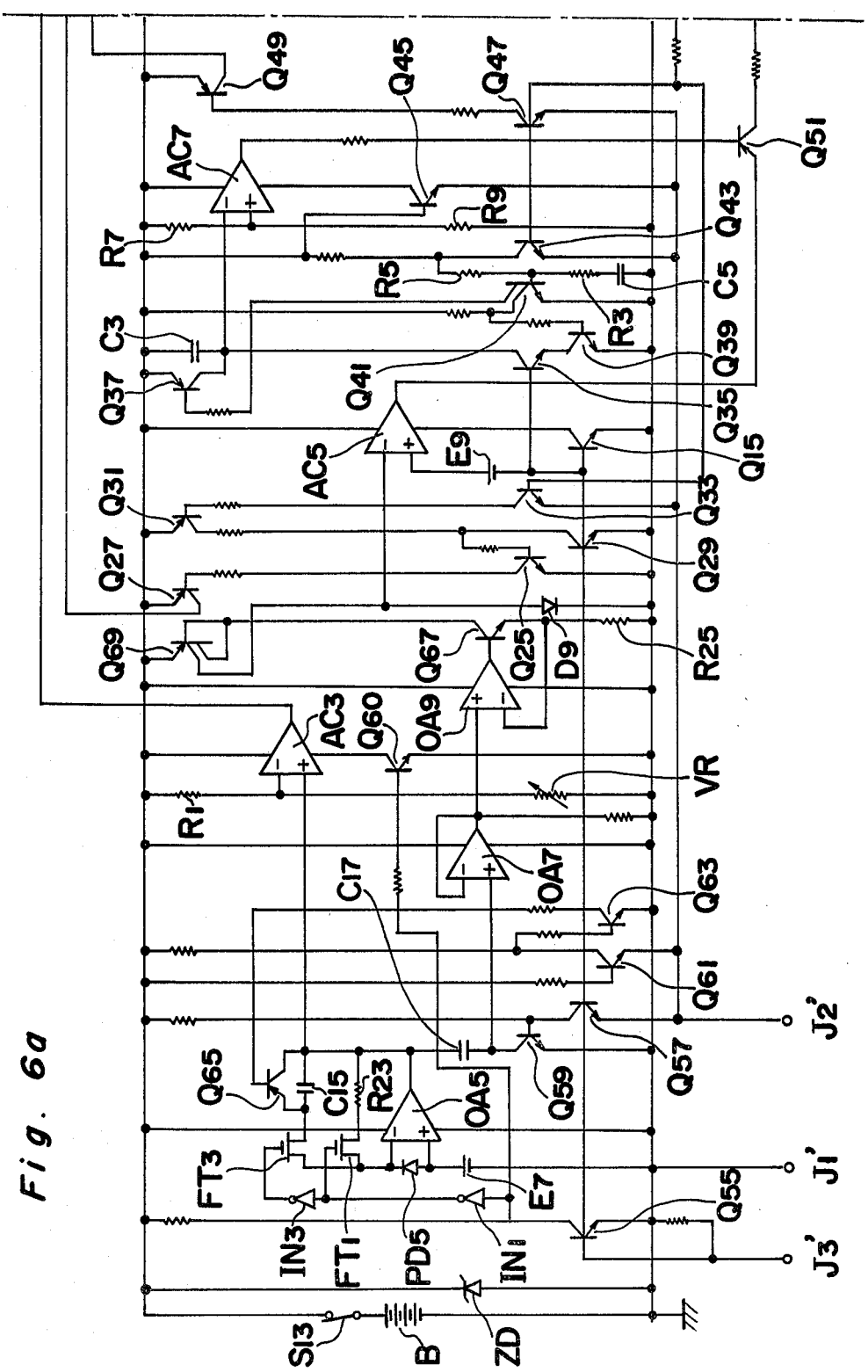

Referring to FIGS. 6a–6b, there is shown a circuit diagram of a light emitting apparatus for use in a exposure system of the first embodiment described above in connection with FIG. 4. In FIGS. 6a–6b, a reference character B designates a source of electric power, such as a battery; S13 designates a power switch; 86 designates a voltage converter; 88 designates a trigger circuit for a xenon tube Xe; and 90 designates a cease emission circuit for stopping the emission of flash light.

When the power switch S13 is closed, switches S15 and S17, provided operatively in association with the power switch S13, are actuated such that the switch S15 closes and switch S17 opens. By the actuation of the voltage converter 86, the main capacitor C7 is charged, and when it is charged to a predetermined level, neon tube Ne conducts and produces a light and, accordingly, a voltage level at a junction between resistors R13 and R11 increases to turn the levels of the bases of transistors Q33, Q43 and Q47 high, respectively.

When the terminal J3' receives a low or ground level signal, i.e., when it is in the instantaneous flash light mode, transistor Q29 is rendered non-conductive. Then, when the synchro-switch S3 provided on the camera side closes, the terminal J2' receives a low level signal for making transistors Q33, Q43 and Q47 conductive, respectively. By the conduction of the transistor Q47, transistor Q49 conducts. And, by capacitor C11 and resistors R15 and R17, a positive going pulse is applied to a gate of a thyristor SC1 for causing the conduction thereof. Therefore, the trigger circuit 88 is actuated to provide a trigger signal to the xenon tube Xe. In the meantime, by the conduction of the transistor Q33, transistor Q31 conducts. In this case, however, since the base of a transistor Q29 is receiving a low level signal, the transistor Q29 remains non-conductive, and thus, a transistor Q25 conducts. By the conduction of the transistor Q25, a transistor Q27 conducts. Accordingly, by capacitor C13 and resistors R19 and R21, a positive going pulse is applied to a gate of thyristor SC3 for causing the conduction thereof. Accordingly, the xenon tube Xe produces an instantaneous flash light. In this instantaneous flash light mode, since the transistor Q55 is in the non-conductive mode, inverters IN1 and IN3 produce low and high level signals, respectively, and thus, field effect transistors FT1 and FT3 provided for use as analogue switches are turned off and on, respectively. Therefore, operational amplifier OA5 is connected with capacitor C15 as a feedback element. Then, when the switch S3 provided on the camera side closes, transistor Q61 is made conductive and transistors Q63 and Q65 are made non-conductive for integrating the electric current produced from the light receiving element PD5 in a capacitor C15. When the voltage across the capacitor C15 reaches a level equal to a voltage level at a junction between variable resistor VR and resistor R1, a comparator AC3 produces a high level signal which is applied to a cease emission circuit 90 for stopping the emission of flash light from the xenon tube Xe. In this case, the aperture size of the camera is controlled by the signal Avc so that the aperture size of the camera corresponds to the size of an aperture located in front of the light receiving element PD5.

In the above described case, although a circuit for effecting the prolonged flash light is also placed in a condition actuatable by the conduction of transistors Q45 and Q43, it will be not actuated since the transistors Q51 and Q53 are maintained non-conductive due to the non-conductive condition of transistor Q15 which maintains the comparator AC5 and transistor Q51 inactivated. The above described operation is directed to instantaneous flash light mode.

Next, the operation for the prolonged flash light mode is explained.

When the shutter speed signal Tv is applied to the terminal J3', transistor Q55 conducts and, thus, inverters IN1 and IN3 produce high and low level signals, respectively. Therefore, field effect transistors FT1 and FT3, for use as analogue switches, are turned on and off, respectively, so that the operational amplifier OA5 is connected with a resistor R23 as a feedback element. Furthermore, since the transistor Q59 is maintained conductive until the terminal J2' receives a signal that starts the light emission, the operational amplifier OA3 produces voltage signal ($2^{Bva}+V3$) (V3 being a voltage produced from a constant voltage source E7) which is charged in the capacitor C17. In this case, the transistor Q15 conducts, the comparator AC5 operates, and transistor Q29 conducts. Thus, transistors Q25 and Q27 are maintained non-conductive. Accordingly, the thyristor SC3 is maintained non-conductive to prevent the xenon tube Xe from producing the instantaneous flash light. Furthermore, since the comparator AC3 is maintained inactive due to the non-conductive condition of the transistor Q60, the cease emission circuit 90 is maintained inactive. When the switch S1 is closed in response to the very beginning of the opening of the shutter, transistors Q33, Q43, Q45 and Q47 are rendered conductive. By the conduction of the transistor Q33, the transistor Q31 also conducts. However, since the transistor Q29 conducts, no instantaneous flash light is produced. By the conduction of the transistors Q47 and Q49, the thyristor SC1 conducts and then the trigger circuit 88 actuates to provide a trigger signal to the xenon tube Xe. Furthermore, by the conduction of transistor Q45, the comparator AC7 actuates, and by the conduction of the transistor Q43, a circuit constituted by capacitor C5, and resistors R3 and R5 produces, after a predetermined period of time, a low level signal that turns the transistor Q41 to its non-conductive state. Accordingly, the transistor Q37 is rendered non-conductive and the transistor Q39 is rendered conductive to cause the capacitor C3 integrate current that flows through the transistors Q35 and Q39.

When the emission of prolonged flash light starts, the operational amplifier OA5 produces a voltage signal ($2^{Iv'}+2^{Bva}+V3$). Since the transistors Q57 and Q59 are rendered conductive and non-conductive, respectively, the input voltage to a buffer amplifier OA7 would be equal to voltage $2^{Iv'}$ obtained by subtracting the charged voltage $2^{Bva}+V3$ in the capacitor C17 from the output voltage $(2^{Iv'}+2^{Bva}+V3)$ from the operational amplifier OA5. This voltage signal $2^{Iv'}$ corresponds to reflected light intensity, from the target object, of the light emitted from the xenon tube Xe. This signal $2^{Iv'}$ produced from the buffer amplifier OA7 is applied to a voltage to current converter constituted by operational amplifier OA9, resistor R25 and transistor Q67 so that the collector current of the transistor Q67 produces a current $2^{Iv'}$ which substantially corresponds to the reflected light intensity of the prolonged flash light emitted from the xenon tube Xe, reflected on the target object and received by the light receiving element PD5. Since the size of the aperture provided in front of the light receiving element PD5 corresponds to the aperture value Avc, the relationship between the above mentioned reflected light intensity $2^{Iv'}$ and the reflected light intensity $2^{Iv}$ measured in front of the aperture can be expressed as $$2^{Iv'}=2^{Iv}\cdot 2^{-Avc}.$$

The collector current of the transistor Q67 flows through a transistor Q69 provided for use as a current mirror to a diode D9, and thus, the diode D9 produces a voltage signal (Iv−Avc). Furthermore, a constant voltage source E9 produces a constant voltage V9 expressed as $$V9=k-Avc.$$

The voltage signal (Iv−Avc) produced from the diode D9 and voltage signal (Tv+k−Avc) from the constant voltage source E9 are applied to a comparator AC5. Since the output voltage from the diode D9 is "0" at the moment when switch S1 provided in the camera closes, the comparator AC5 produces a high level signal and a comparator AC7 produces a low level signal for causing the conduction of the transistors Q51 and Q53. Thereupon, a current flows through the xenon tube Xe, the coil L1 and the transistor Q53 for causing the xenon tube Xe to emit light. In this case, the current flowing through the xenon tube Xe may not increase abruptly due to the braking effect of the coil L1. More particularly, the current flowing through the coil L1 will be accumulated therein in a form of electromagnetic energy. Then, when the output voltage from the diode D9 increases, the comparator AC5 produces a low level signal for rendering the transistor Q53 non-conductive. Thereupon, the energy accumulated in the coil L1 dissipates so as to supply current through diode D7 and xenon tube Xe. Therefore, at the moment when the transistor Q53 has become non-conductive, an abrupt current flows through the xenon tube Xe from the coil L1 so that the light emitted from the xenon tube Xe further increases in its intensity. Thereafter, the intensity of the flash light gradually decreases relative to the decrease of the output voltage of the operational amplifier OA5. When the output voltage from the operational amplifier OA5 drops below the output voltage level of the constant voltage source E9, the comparator AC5 again produces a high level signal. After a short response period, the xenon tube Xe again starts to increase the intensity of light emitted therefrom. The above operation is repeated again and again at a high frequency, during the light emission of the prolonged flash light, to provide an approximately constant light intensity for the prolonged flash light.

It is to be noted that the reflected light intensity measured in front of the aperture is $$Iv=Tv+k,$$

since the intensity of the emitted light is so controlled as to satisfy (Tv+k−Avc=Iv−Avc) due to the comparison between signal Tv+k−Avc obtained through the adding calculation of the signal Tv from the terminal J3′ and the signal k−Avc from the constant voltage source E9, and the signal Iv′=Iv−Avc, in the comparator AC5.

The control of the duration of the prolonged flash light is as follows. When the transistor Q43 conducts in response to the closure of the switch S1 provided in the camera, a transistor Q41 becomes non-conductive after a predetermined period of time determined by the capacitor C5 and resistors R3 and R5. This predetermined period of time corresponds to a time t1 between the very beginning of the opening of the shutter by the leading curtain and the completion of the scan of the leading curtain. Due to the non-conductive state of the transistor Q41, the transistor Q37 becomes non-conductive and the transistor Q39 becomes conductive. Accordingly, the transistor Q35 receives the signal Tv at its base and, thus, its collector produces a current signal $2^{Tv}$. This current signal $2^{Tv}$ is used for charging the capacitor C3. When the voltage appearing at a junction between the capacitor C3 and the transistor Q35 coincides with the voltage appearing at a junction between the resistors R7 and R9, the comparator AC5 produces a high level signal and, therefore, the transistors Q51 and Q53 becomes non-conductive so as to stop the emission of light from the xenon tube Xe. Accordingly, the time period during which the prolonged flash light is emitted is equal to (t1+$2^{-Tv}$).

As described above, the light emitting apparatus of FIGS. 6a−6b operates as a known auto-strobo during the instantaneous flash light mode and, during the prolonged flash light mode it operates in such a manner that the reflected light intensity and light emitting period are set to ($2^{Tv+k}$) and ($2^{-Tv}$+t1), respectively, by the use of the shutter speed signal Tv, and thus the reflected light amount is set to $$2^{Qvf}=t1\cdot 2^{Tv+k}+2^k. \qquad (5)$$

Accordingly, the amount of light reaching the film surface during the prolonged flash light, i.e., the effective light amount, is set to $2^k$, regardless of the shutter speed.

It is to be noted that the capacitor C9 is provided for maintaining the transistors Q33, Q43 and Q47 in the conductive state until the emission of the prolonged flash light is completed, even if the neon tube Ne becomes non-conductive due to the voltage drop across the main capacitor C7. Furthermore, since the opening of the switch S13 opens the switch S15 and, in turn, closes the switch S17, the transistors Q33, Q43 and Q47 will not be rendered conductive even if the main capacitor C7 is charged to the predetermined level. Accordingly, xenon tube Xe will not be actuated so as to produce light. Moreover, in this case, since no high level signal indicative of the completion of charging is produced from the terminal J4′, the exposure system controls the camera under the condition without using any flash light.

Figure 7:
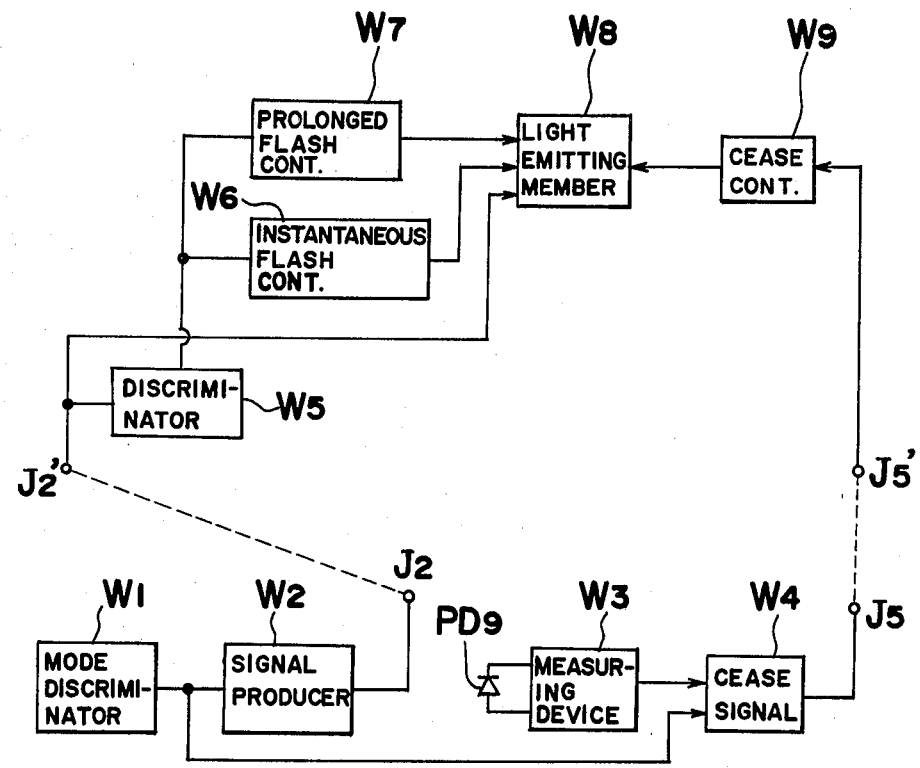
FIG. 7 is a block diagram showing an exposure system according to the second embodiment of the present invention.

Referring to FIG. 7, there is shown a block diagram according to the second embodiment of the exposure system of the present invention. The exposure system of the second embodiment includes a mode discriminator W1 which determines whether it is a prolonged flash light mode or an instantaneous flash light mode, and a signal producer W2 provided in association with the mode discriminator W1 for producing a light emission start signal. By the light emission start signal, a prolonged flash light controller W7 actuates a light emitting member W8 when the calculated shutter speed is faster than the synchronizing shutter speed, or otherwise an instantaneous flash light controller W6 actuates the light emitting member W8 when the calculated shutter speed is slower than the synchronizing shutter speed. The control of the shutter speed and light amount to be emitted from the light emitting member W8 is carried out by a measuring device W3 having a light measuring element PD9 positioned adjacent the film frame for receiving light that has been reflected from the film surface. The measuring device W3 continuously integrates the light received by the light measuring element PD9 and produces a cease signal W4 when the integrated amount reaches a predetermined level. The cease signal W4 is applied to a cease controller W9 for stopping the light emission from the light emitting member W8.

Figure 8:
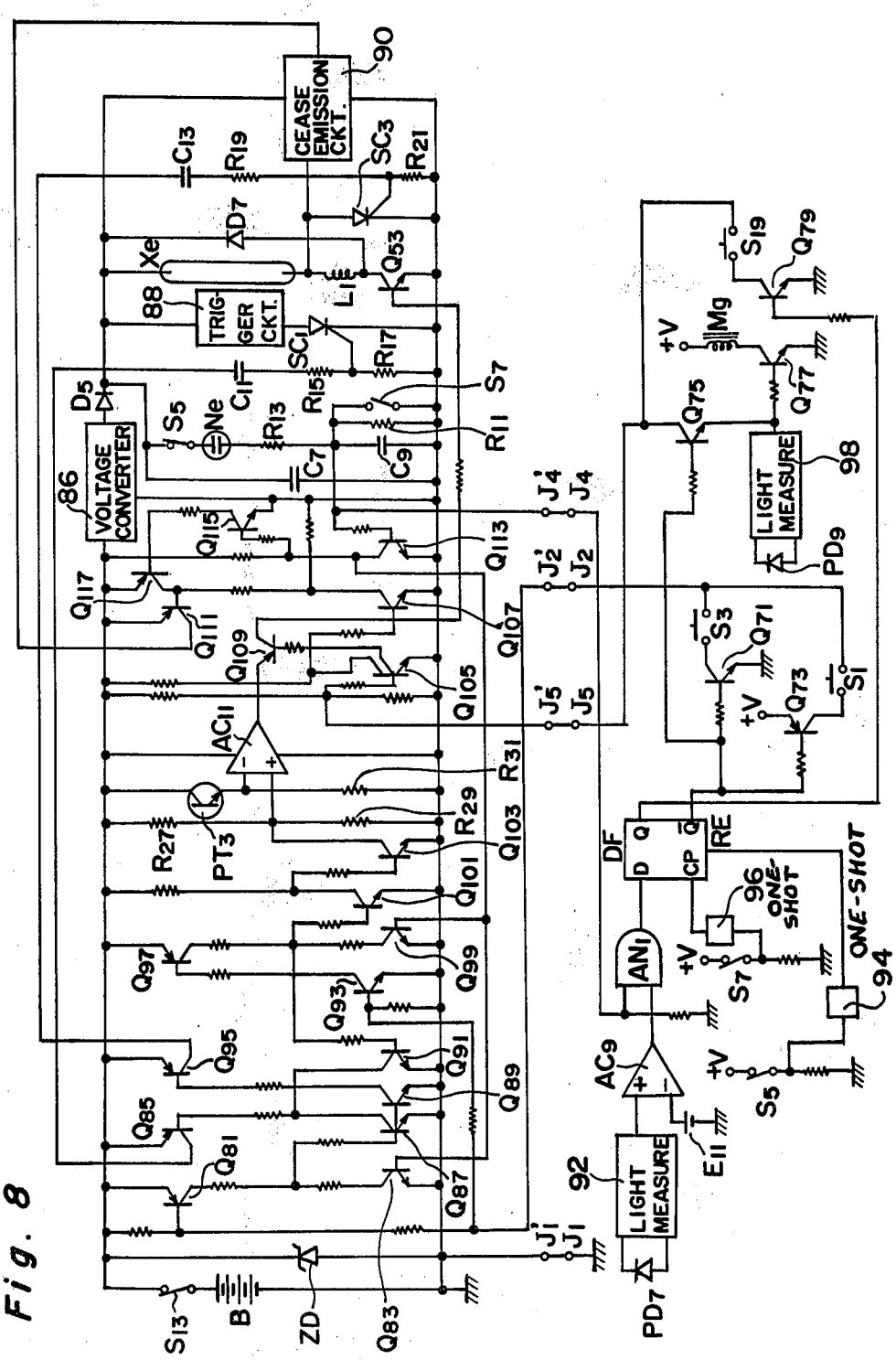
FIG. 8 is a circuit diagram of the exposure system of FIG. 7.

Referring to FIG. 8, a circuit diagram according to the block diagram of FIG. 7 is shown. In the circuit of FIG. 8, PD7 designates a light receiving element provided in a light path that is directed to a viewfinder; 92 designates a measuring circuit for measuring the light and calculating the shutter speed; E11 designates a constant voltage source for producing a voltage signal corresponding to the synchronizing shutter speed; 94 and 96 each designate a one-shot multivibrator; PD9 designates a light measuring element for measuring the light that has been reflected from the film surface; 98 designates a measuring circuit for measuring and integrating the light measured by the light measuring element PD9; Mg designates an electromagnet for holding the trailing curtain in an engaged condition; and S19 designates a switch which closes when the trailing curtain completes its scan and opens when the shutter mechanism is charged. A terminal J5, connectable to a corresponding terminal J5′ provided in the light emitting apparatus, and supplies a signal for stopping the light emission from the light emitting apparatus.

When the switch S5 is closed, a pulse is produced from the one-shot multivibrator 94 for resetting a D flip-flop DF. When the output signal from the measuring circuit 92 exceeds the signal from the constant voltage source E11, a comparator AC9 produces a high level signal. At that instant, if the main capacitor C7 is charged to a predetermined level and thus the terminal J4 is producing a high level signal, an AND gate AN1 produces a high level signal. Thereafter, when a release switch S7 is closed, the one-shot multivibrator 96 produces a pulse which is applied to the clock terminal of the D flip-flop DF for latching a high level signal at its Data-terminal and for producing high and low level signals from Q and $\overline{Q}$ terminals, respectively, of the D flip-flop DF. Thereupon, the exposure control starts in a known manner by a release circuit (not shown). When the leading curtain scans so as to open the film frame, the light measuring element PD9 receives the light reflected from the film surface and/or the surface of the leading curtain and converts the received light an electric current which is applied to the measuring circuit 98. In the measuring circuit 98, the received current is continuously integrated. Meanwhile, at the very beginning of the opening of the shutter by the scan of the leading curtain, switch S1 closes to supply a high voltage to the base of a transistor Q93 through a transistor Q73, the base level of which has been rendered low in response to the $\overline{Q}$ output of D flip-flop DF. It is to be noted that the transistor 81 remains non-conductive when the high voltage from the switch S1 is supplied to the base of a transistor Q81. Since the junction between the resistors R13 and R11 is producing a high level signal, transistor Q113 is conductive, transistors Q115 and Q117 are non-conductive, and transistors Q83 and Q99 are non-conductive. Accordingly, by the conduction of a transistor Q97, transistors Q91 and Q85 conduct so as to supply a trigger to the xenon tube Xe in a similar manner to that carried out in the circuit of FIGS. 6a and 6b. Furthermore, transistor Q101 conducts and thus, transistor Q103 is rendered to non-conductive. Accordingly, a junction between resistors R27 and R29 produces a high level signal which is applied to a comparator AC11 which thereupon produces a high level signal. At that instant, since the transistors Q105 and Q109 are in their conductive state, transistor Q53 conducts so as to produce light from the xenon tube Xe. The light intensity of the flash light from the xenon tube Xe is monitored by a phototransistor PT3 such that the phototransistor PT3 produces a current signal indicative of the intensity of the flash light. When the current from the phototransistor PT3 increases due to the increase in the flash light intensity, the voltage level at a junction between the phototransistor PT3 and resistor R31 increases, and when the voltage at the junction exceeds a voltage level at the junction between resistors R27 and R29, the comparator AC11 produces a low level signal for rendering the transistor Q53 non-conductive. Thereafter, a similar operation is carried out repeatedly to produce a prolonged flash light from the xenon tube Xe with the light intensity rendered approximately constant relative to the voltage produced at the junction between the resistors R27 and R29, in a manner similar to that described above in connection with FIGS. 6a and 6b.

The measuring circuit 98 provided in the camera integrates the current obtained from the light measuring element PD9 in a manner described above. It is to be noted that the light measuring element PD9 produces a current relative to the reflected light intensity of ambient light and flash light in total. When the integrated value in the measuring circuit 98 reaches a predetermined level, the measuring circuit 98 produces a low level signal for rendering a transistor Q77 nonconductive. Thereupon, the electromagnet Mg is deenergized to release the trailing curtain which accordingly scans across the film surface. In this case, since the $\overline{Q}$ terminal of the D flip-flop is producing a low level signal, the transistor Q75 is maintained nonconductive. When the trailing curtain completes its scan, a switch S19 closes to supply a low level signal to the terminal J5 through a transistor Q79, which has been maintained conductive by the high level signal obtained from the Q terminal of the D flip-flop DF. The low level signal supplied to the terminal J5 is further supplied to the transistor Q105 for rendering it non-conductive. Accordingly, since the transistor Q113 is conductive, the transistors Q115 and Q117 are rendered non-conductive and the transistors Q107 and Q111 are rendered conductive so as to actuate a light emission cease circuit 90. Accordingly, the xenon tube Xe stops producing the prolonged flash light. Furthermore, by the rendering of the transistor Q105 non-conductive, the transistor Q109 becomes non-conductive and, in turn, the transistor Q53 becomes non-conductive.

When the voltage signal produced from the measuring circuit 92 is lower than that from the constant voltage source E11, the comparator AC9 produces a low level signal and, thus, the AND gate AN1 produces a low level signal. Thereafter, when the release switch S7 is closed, the low level signal from the AND gate AN1 is stored in the D flip-flop DF. Thus, the Q and $\overline{Q}$ terminals of the D flip-flop DF produce low and high level signals, respectively.

Since the transistor Q73 is maintained non-conductive, the closure of the switch S1 effected in response to the scan of the leading curtain will not supply any high voltage signal to the transistor Q93. Accordingly, no flash light emission is effected. Then, when the synchroswitch S3 closes, the transistor Q71 and Q81 conduct. In this instant, since the transistor Q113 is in a conductive state, a transistor Q83 is maintained non-conductive and transistors Q87, Q89, Q85, and Q95 are rendered to conductive. Accordingly, the trigger circuit 88 actuates and, at the same time, the thyristor SC3 conducts to start the emission of instantaneous flash light from the xenon tube Xe. Thereafter, when the measuring circuit 98 produces a signal for starting the scan of the trailing curtain, transistor Q75 conducts and transistor Q105 is rendered non-conductive and, accordingly, transistors Q107 and Q111 are rendered conductive so as to actuate the light emission cease circuit 90. Accordingly, the xenon tube Xe stops producing the instantaneous flash light.

It is to be noted that when the transistor Q113 is maintained non-conductive due to the failure of the charging of the main capacitor C7 to the predetermined level, transistors Q83, Q99, Q115, and Q117 conduct to prevent the xenon tube Xe from producing any flash light.

Figure 9:
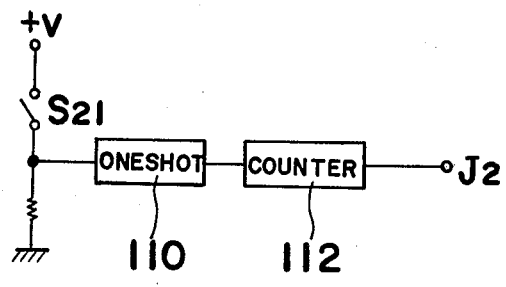
FIG. 9 is a block diagram showing a modified switch mechanism for use in the circuit of FIG. 8.

In the embodiment of FIG. 8, the signal for starting the emission of the prolonged flash light is produced by the closure of the switch S1 in response to the very beginning of the opening of the shutter. Such a signal, however, can be produced from a count switch (not shown) which is provided for controlling the shutter speed or a switch which is coupled to an FP terminal (not shown) of the camera. Instead of the above, it is possible to further provide a switch arrangement that produces the prolonged flash light starting signal as shown in FIG. 9. In FIG. 9, a switch S21 closes in response to the start of scanning of the leading curtain which is effected before the very beginning of opening of the film frame. By the closure of the switch S21, a one-shot multivibrator 110 produces a pulse which is applied to a counter 112 which then starts to count for a predetermined period of time necessary for the leading curtain to scan to a position where the leading curtain is about to open the film frame. After counting for the predetermined period of time, the counter produces a pulse which is applied through a terminal J2 to the light emitting apparatus for effecting the emission of the prolonged flash light. It is to be noted that the switch arrangement of FIG. 9 can be employed in any embodiment of the exposure system of the present invention.

Figure 10:
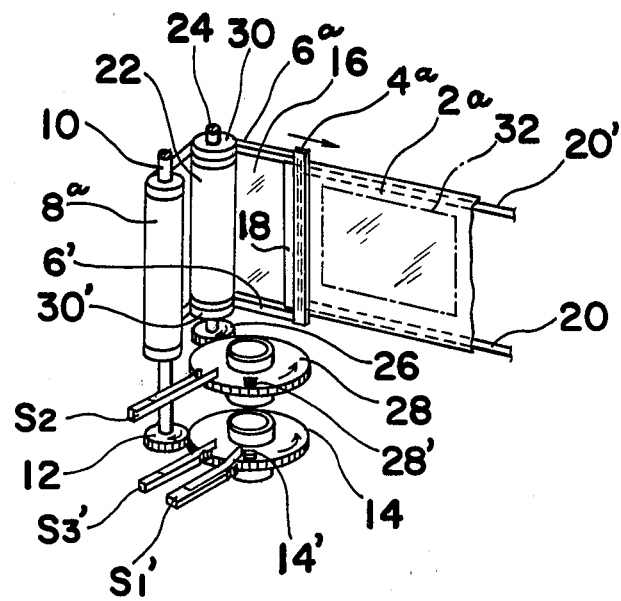
FIG. 10 is a perspective view showing a shutter release mechanism for use in the exposure system of FIG. 4.

Referring to FIG. 10, essential parts of a focal plane shutter mechanism for use in the exposure system of the first embodiment, particularly of FIG. 4, is shown. In FIG. 10, the shutter mechanism shown is in the shutter charged condition and includes a leading curtain 2a positioned in front of a film frame 32 constituting a shutter opening, an edge bar 4a connected to the end of the leading curtain 2, a pair of ribbons 6a and 6' extending from opposite ends of the edge bar 4a, a cylinder 8a rigidly mounted on a shaft 10 for winding thereon the ribbons 6a and 6', a gear 12 rigidly mounted on the shaft 10 and a gear 14 engaged with the gear 12. The shutter mechanism further includes a trailing curtain 16, an edge bar 18 connected to the end of the trailing curtain 16 and positioned adjacent to the edge bar 4a, a pair of ribbons 20 and 20' extending from the edge bar 18, a cylinder 22 rigidly mounted on a shaft 24 for winding thereon the trailing curtain 16, a gear 26 rigidly mounted on the shaft 24 and a gear 28 engaged with the gear 26. Also provided in the shutter mechanism is a shutter speed control mechanism (not shown) of any known type for controlling the scan of the trailing curtain so as to start a a preselected time after the leading curtain has started to scan. A pair of rollers 30 and 30' are rotatably mounted on the shaft 24 adjacent the opposite ends of the cylinder 22 for guiding the ribbons 6a and 6'.

Provided adjacent to the gear 14 are switches S1' and S3' which are actuated by a projection 14' mounted on the gear 14. When the shutter mechanism is in the charged condition as shown, the switch S1' is held open by the projection 14' and the switch S3' is maintained open by the resiliency of its arms. Then, when the leading curtain 2a starts to scan by the release of the shutter mechanism, each of the gears 12 and 14 rotates in a direction indicated by respective arrows, so that the projection 14' starts to move away from the switch S1'. The switch S1' and the projection 14' are positioned in such a relation that the switch S1' is turned on by the resiliency of its arm when the projection 14' has moved a predetermined degree which corresponds to a predetermined distance of scan of the leading curtain 2a capable of locating the edge bar 4a in alignment with the left-hand side edge of the shutter opening in the film frame 32. In other words, the switch S1' closes immediately before the leading curtain 2a starts to open the shutter opening. When the leading curtain 2a completes its scan, the projection 14' pushes the arm of the switch S3' to close the switch S3'.

Similarly, a switch S2 is provided adjacent the gear 28 which is actuated by a projection 28' mounted on the gear 28. The switch S2 is maintained closed by the resiliency of its arm when the shutter mechanism is in the charged condition and, opens when the trailing curtain 16 completes its scan. In a preferred embodiment, the switch S2 and the projection 28' are positioned in such a fashion that the projection 28' pushes the arm of the switch S2 immediately before the trailing curtain 16 completes it scan so as to ensure the opening of the switch S2.

Figure 11:
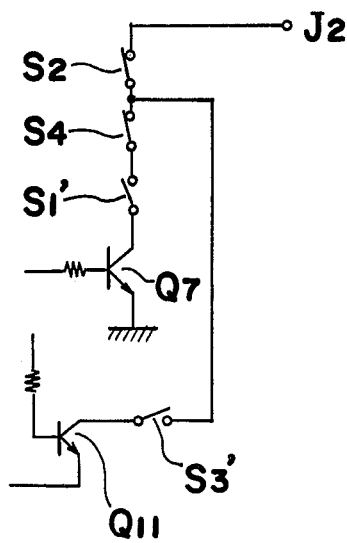
FIG. 11 is a circuit diagram of switches employed in the shutter release mechanism of FIG. 10.

Referring to FIG. 11, there is shown a circuit, using the switches S1', S3' and S2 of FIG. 10, and a switch S4 which closes during the photographic operation, for use in the circuit of FIG. 4. In place of the switch S1 (FIG. 4), switches S1' and S4 are inserted in series and the switch S2 is connected between the switch S4 and the terminal J2. Furthermore, in plane of the switch S3 (FIG. 4), switch S3' is inserted. Therefore, the series connected switches S1', S4 and S2 serve as the switch S1 of FIG. 4 and the series connected switches S3' and S2 serve as the switch S3 of FIG. 4. A timed relationship among these switches S1, S2, S3, S4, S1' and S3' and the curtains 2a and 16 is shown in FIG. 12.

Figure 12:
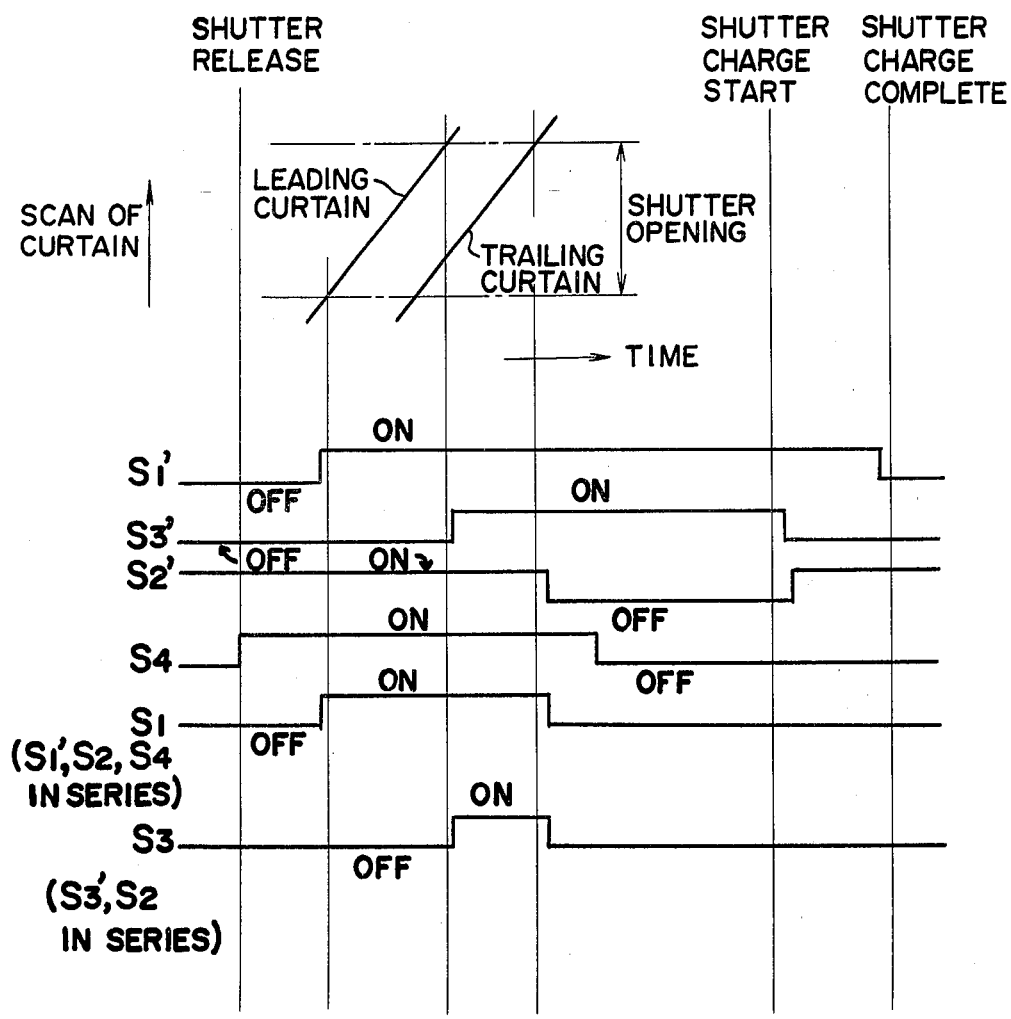
FIG. 12 is a time chart showing relationship among the switches used in the circuit of FIGS. 4 and 11 and the curtains employed in the shutter release mechanism.

As apparent from the chart of FIG. 12, the switch S1' closes immediately before the opening of the shutter and, opens immediately before the completion of charging of the shutter mechanism. The switch S3' closes immediately before the completion of scan of the leading curtain 2a and opens immediately after the start of charging of the shutter mechanism. The switch S2 opens about when the trailing curtain 16 completes its scan and closes after the start of charging of the shutter mechanism.

The switch S4 (not shown in FIG. 10) closes in response to the release of the shutter mechanism and opens when one cycle of a photographic operation has been completed.

Therefore, when taking the series connected switches S1', S4 and S2 into consideration, such a series circuit closes immediately before the opening of the shutter and opens after the completion of scan of the trailing curtain 16. Therefore, it can be said that the series connected switches S1', S4 and S2 altogether operates in the same manner as the switch S1 shown in FIG. 4.

Similarly, the series connected switches S3' and S2 closes when the leading curtain completes its scan and opens when the shutter mechanism completes its operation. Therefore, it can be said that the series connected switches S3' and S2 altogether operates in the same manner as the synchro-switch S3 shown in FIG. 4.

Figure 13:
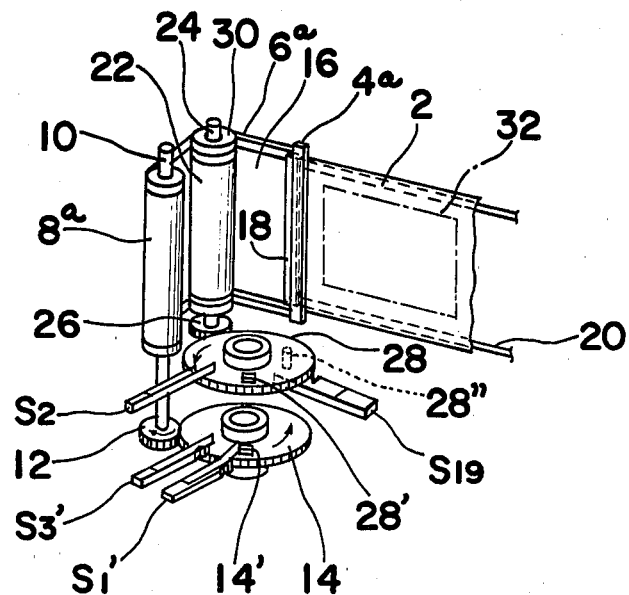
FIG. 13 is a perspective view showing a shutter release mechanism for use in the exposure system of FIG. 8.

Referring to FIG. 13, essential parts of a focal plane shutter mechanism for use in the exposure system of the second embodiment, particularly of FIG. 8, is shown. The shutter mechanism of FIG. 13 includes, in addition to those switches shown in FIG. 10, a normally open type switch S19. The parts which are identical with those shown in FIG. 10 are given with the same reference character or number and their operations are understood to be the same. The normally open type switch S19 is provided so as to be operative in association with a projection 28'' mounted on a surface of the gear 28 opposite to that mounted with the projection 28'. The switch S19 closes when the gear 28 has made one rotation.

Figure 14:
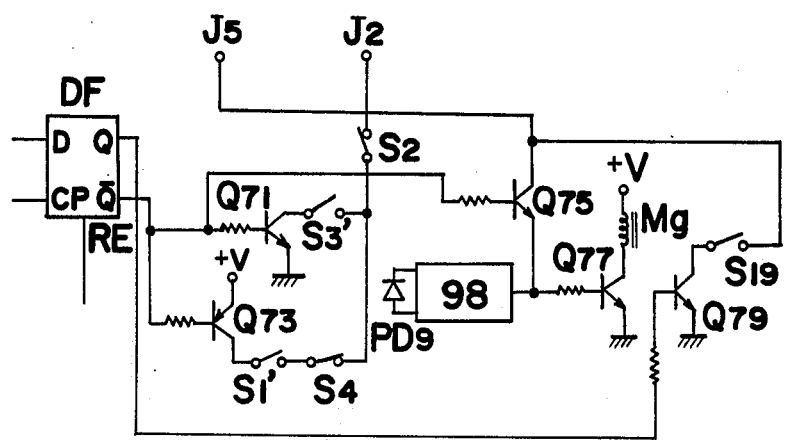
FIG. 14 is a circuit diagram of the switches employed in the shutter release mechanism of FIG. 13.

FIG. 14 shows a circuit diagram for use in the circuit of FIG. 8 for providing signals to the terminals J2 and J5. In FIG. 14, switches S1', S4 and S2 are connected in series to the collector of the transistor Q73 in place of the switch S1 (FIG. 8) and the switch S3' is connected to the collector of the transistor Q71 in place of the switch S3 (FIG. 8). The other end of the switch S3' remote from the transistor Q71 is connected to a junction between the switches S4 and S2. Furthermore, the switch S19 is connected between the collector of the transistor Q79 and the terminal J5. A timed relationship among the switches S1, S2, S3, S4, S1', S3' and S19 and the curtains 2a and 16 is shown in FIG. 15.

Figure 15:
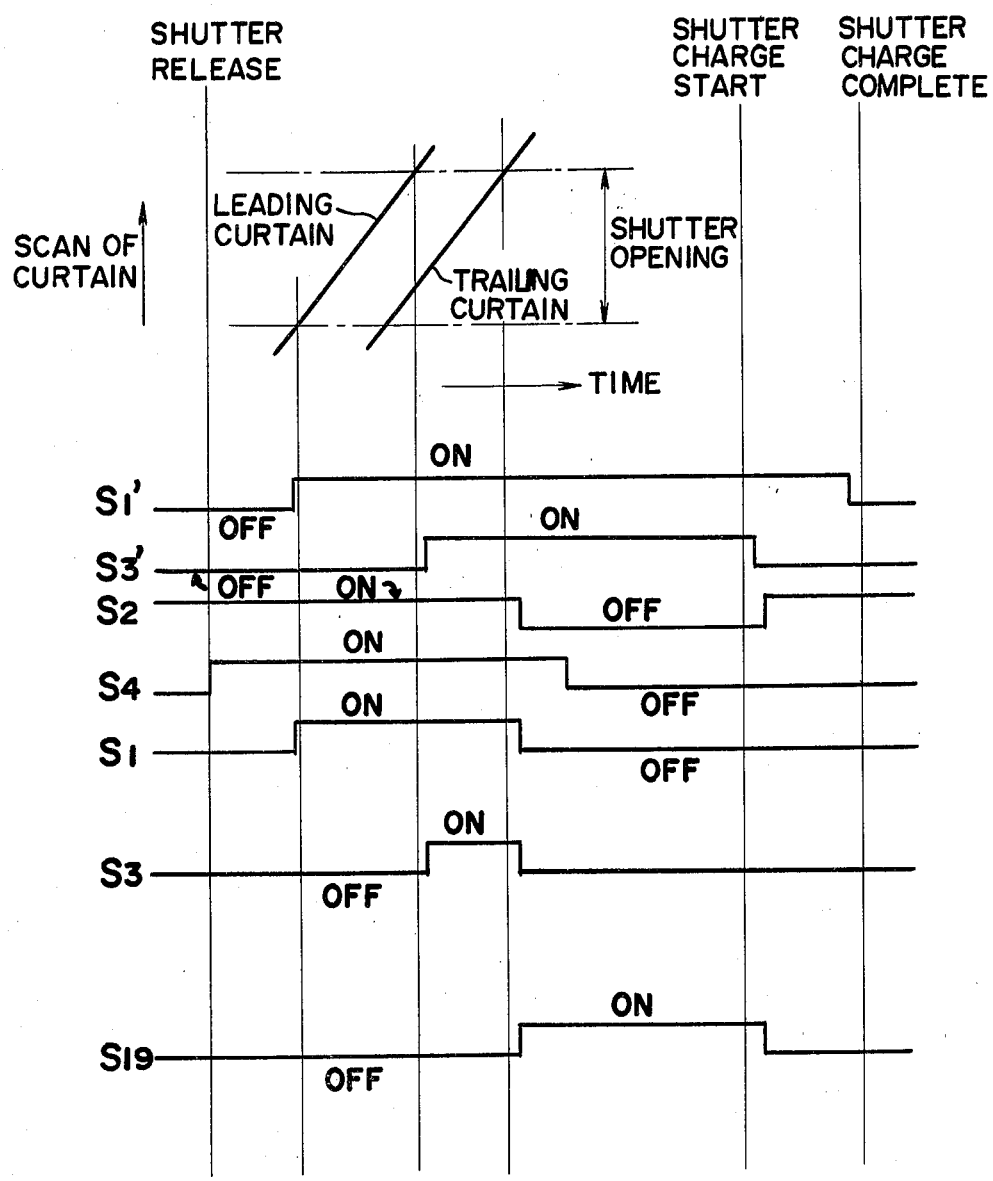
FIG. 15 is a time chart showing relationship among the switches used in the circuit of FIGS. 8 and 14 and the curtains employed in the shutter release mechanism.

In FIG. 15, since the operation of the switches other than the switch S19 is the same as that described above in connection with FIG. 13, only the operation of switch S19 is described in detail. Before the description of the switch S19, it is to be noted that the series connected switches S1', S4 and S2 close immediately before the opening of the shutter and open when the operation of the shutter mechanism is completed. Therefore, it can be said that the series connected switches S1', S4 and S2 altogether operate in the same manner as the switch S1 shown in FIG. 8. Furthermore the series connected switches S3' and S2 close when the leading curtain completes its scan and open when the shutter mechanism completes its operation. Therefore, it can be said that the series connected switches S3' and S2 altogether operate in the same manner as the synchroswitch S3 shown in FIG. 8.

The switch S19 closes when the trailing curtain 16 completes its scan and opens in response to the start of the charging of the shutter mechanism. When the switch S19 closes, it provides a signal through the terminal J5 to the cease controller so as to stop the emission of flash light.

Before describing the third embodiment of the present invention, the difference of brightness of the target object between that obtained under only the ambient light and that obtained under the ambient light aided with the flash light is explained from a theoretical point of view.

According to the first embodiment described above in connection with FIGS. 2 and 3, the brightness Bva and the effective light amount k are known prior to the photographic operation. Therefore, the difference of the effect on the target object between the ambient light only and the flash light only, and the difference of the effect on the target object between the ambient light only and the combined light of ambient light and flash light can be previously known. The former difference expressed by the APEX index is generally called lighting contrast, and the later difference expressed by the APEX index is hereinafter referred to as "step difference".

According to the shutter-speed-priority automatic exposure system of FIG. 2, the lighting contrast $\Delta 1$ can be expressed as follows $$(Bva - Tvs) - k = \Delta 1, \quad (13)$$

and the step difference $\Delta 2$ can be obtained from the following calculation:

$$2^{Bva - Tvs} + 2^k = 2^{Qvt} \quad (8\text{-}2)$$

wherein Qvt is a total light amount of the flash light amount and the ambient light amount expressed by the APEX index. From the equations (13) and (8-2), eliminating the constant k and taking the logarithm with respect to the base 2, the following equation is obtained:

$$Qvt = Bva - Tvs + \log_2 (1 + 2^{\Delta 1}) \quad (14)$$

Since the step difference $\Delta 2$ is equal to (Qvt−(Bva−Tvs), the following equation is obtained from the equation (14):

$$\Delta 2 = Qvt - (Bva - Tvs) = \log_2 (1 + 2^{\Delta 1}) \quad (15)$$

According to the aperture-priority automatic exposure system of FIG. 3, the lighting contrast can be obtained from the equation (11) as follows.

$$\Delta 1 = (Bva - Tvx) - k = \log_2 (2^{\Delta} - 1) \quad (11\text{-}1)$$

The step difference for the case can be obtained from the equation (15).

According to the first embodiment, the effective light amount exposed on the film surface is maintained constant regardless of a change of the shutter speed by the change of the light intensity of the prolonged flash light relative to the shutter speed. This system can be varied in a manner as explained below.

When the reflected light intensity $2^{Iv}$ is maintained constant, regardless of a change in the shutter speed, a value Bv which satisfies the equation $$2^{Bva} + 2^{Iv} = 2^{Bv} \tag{20}$$

can be previously obtained. By the use of this value Bv and the formula:

$$Bv + Sv = Tv + Av \tag{21}$$

for the APEX calculation under ambient light only, it is possible to obtain the value of the unknown Tv (which has been expressed as Tvx) or the unknown Av (which has been expressed as Avx). The obtained value of Tv or Av can be used for carrying out the proper photography under the prolonged flash light. In order to obtain the value Bv, $$Bva - Iv \times \Delta'' \tag{22}$$

is first carried out. Then, from the equations (30) and (32), $$2^{Bva}(1 + 2^{-\Delta''}) = 2^{Bv}$$

is obtained, and when the logarithm is taken with respect to the base 2, $$Bv = Bva + \log_2(1 + 2^{-\Delta''}) \tag{23}$$

is obtained. It is unnecessary to say that the prolonged flash light is emitted from the very beginning of opening of the shutter to the complete closure of the same. In this case, it is possible to previously calculate the lighting contrast $\Delta 1$ by the use of the following equation in a manner similar to that described above:

$$\Delta 1 = Bva - Iv \tag{24}$$

and the step difference $\Delta 2$ may be calculated by the use of the following equation $$\Delta 2 = Bv - Bva \tag{25}$$

Figure 16:
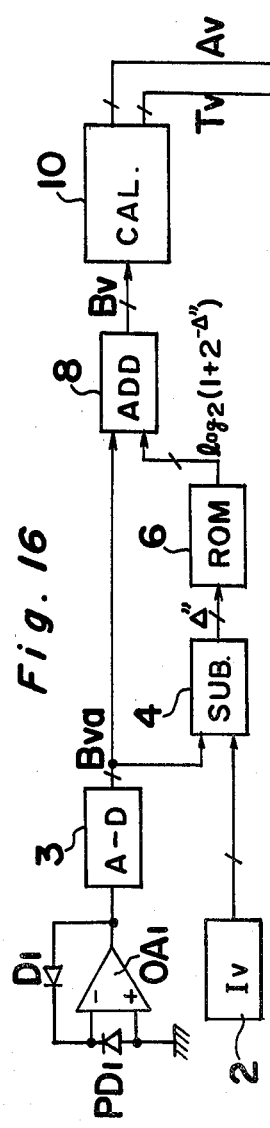
FIG. 16 is a block diagram showing an exposure system according to the third embodiment of the present invention.
Figure 17:
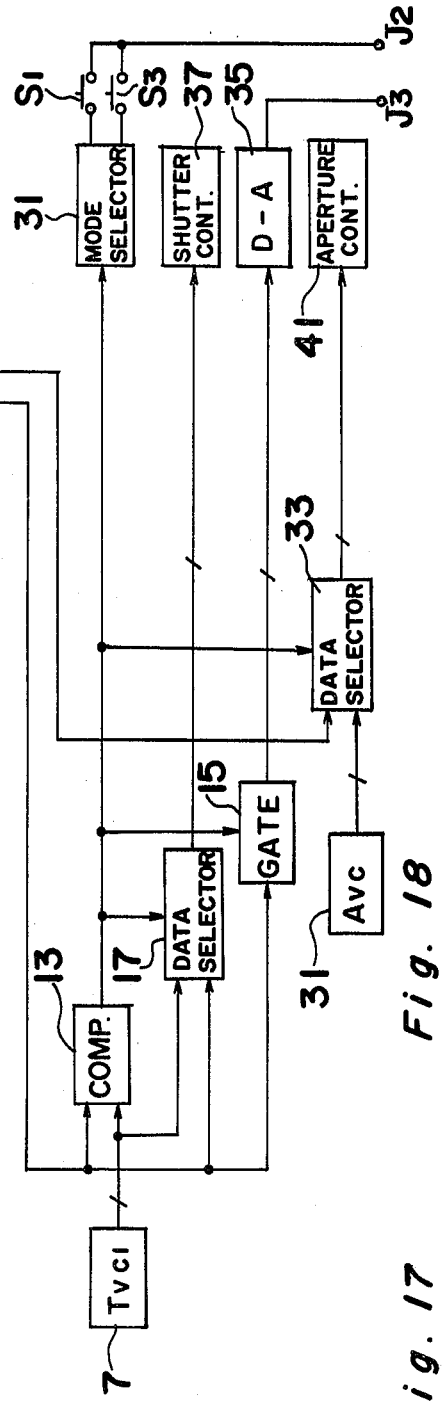
FIG. 17 is a circuit to be employed in the circuit of FIG. 6.

Referring to FIG. 16, there is shown a block diagram of the exposure system according to the third embodiment of the present invention. In FIG. 16, blocks which are identical with those shown in FIG. 2 are designated by the same reference numerals. An analogue-to-digital converter 3, data output circuit 2, substractor 4, ROM 6 and adder 8 are provide for carrying out the equation (23) and, therefore, obtaining the value Bv. By the use of the obtained value Bv, a calculator 10 of a known type calculates and produces appropriate data Tv and Av for use in a shutter-speed-priority automatic epxosure system an aperture-priority automatic exposure system, or a programm exposure system. Thereafter, the operation similar to that carried out in the exposure system of FIG. 2 is carried out. More particularly, it is determined whether the selected mode is the instantaneous flash light mode or the prolonged flash light mode and, thereafter, the corresponding operation takes place. When the prolonged flash light mode is selected, the duration of the prolonged flash light is controlled in the same manner as in the exposure system of FIG. 2. Since the reflected light intensity, however, must be maintained constant, the non-inverting input of the comparator AC5 (FIG. 6) is supplied with a constant voltage from the constant voltage source E15, as shown in FIG. 17.

Figure 18:
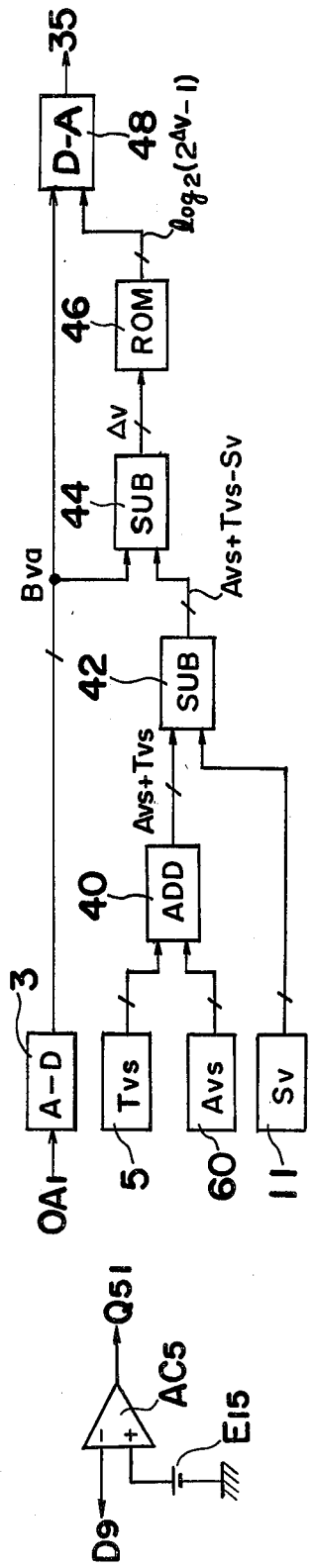
FIG. 18 is a block diagram according to the fourth embodiment of the present invention.

Referring to FIG. 18, there is shown a block diagram showing the main portion of the exposure system according to the fourth embodiment of the present invention. In FIG. 18, the parts which are identical to those described above in the previous embodiments are designated by the same reference numerals. According to the fourth embodiment, the lacking light intensity Ivx is calculated by the use of information corresponding to the set shutter speed Tvs, the set aperture value Avs, the film sensitivity Sv and the brightness Bva of the target object. The calculated light intensity Ivx is used for controlling the light intensity of the prolonged flash light. The control is explained below from a theoretical point of view.

Since the above given information satisfies the equation:

$$(2^{Bva - Tvs} + 2^{Ivx - Tvs}) = 2^{Avs = Sv}, \tag{8-3}$$

and when it is defined that $$Avs + Tvs - Sv - Bva \equiv \Delta v, \tag{26}$$

the following equation (27) is obtained by eliminating the term (Avs + Tvs − Sv).

$$Ivx = Bva + \log_2(2^{\Delta v} - 1) \tag{27}$$

Therefore, by obtaining the value $\Delta v$ from the equation (27) and, thus obtaining the value $\log_2(2^{\Delta v} - 1)$, it is possible to obtain the value Ivx from the equation (27).

In FIG. 18, the calculation Avs + Tvs is carried out in the adder 40, and in the subtractors 42 and 44 the calculation of equation (26) is carried out. Thus, the value $\Delta v$ is obtained from the subtractor 44. The obtained data $\Delta v$ is converted into data corresponding to the value of $\log_2(2^{\Delta v} - 1)$ in ROM 46, and then, in the adder 48, the calculation of equation (27) is carried out by the use of data Bva from the analogue-to-digital converter 3 and data $\log_2(2^{\Delta v} - 1)$ from the ROM 46 for obtaining the data Ivx. The obtained data Ivx is supplied through the digital-to-analogue converter 35 to the non-inverting input terminal of the comparator AC5 for the control of intensity of the prolonged flash light in a manner similar to that carried out in the circuit of FIG. 6. Accordingly, the intensity of the reflected light under the prolonged flash light can be maintained equal to the value Ivx.

In the first embodiment, it has been described that the effective light amount $2^k$ is maintained constant. It can be, however, arranged so as to be variable for allowing the operator to choose his desired value. Furthermore, in the case where a device for setting the light amount $2^k$ is set in the light emitting apparatus side, it is necessary to provide a variable voltage source in the light emitting apparatus. The voltage signal corresponding to the chosen light amount is transmitted to the camera side when it is ready to emit light and, in the camera side, the voltage signal is converted into a digital form for the calculation of the proper Tvx and Avx values. In the mean time, the analogue signal Tv corresponding to the shutter speed is supplied to the light emitting apparatus. On the other hand, when the device for setting the light amount $2^k$ is to be provided in the camera side, it is necessary to provide a setting device for setting a digital data value corresponding to the chosen value for k. Thereafter, the above described calculations are carried out for supplying signals Tv and k in an analogue form to the light emitting apparatus.

Although the present invention has been fully described by way of examples with reference to the accompanying drawings, it is to be noted that various changes and modifications are apparent to those skilled in the art. Therefore, unless such changes and modifications depart from the true scope of the present invention, they should be construed as included therein.

What is claimed is:

1. A photographic system for flash photography with a camera comprising:
    means for projecting an artificial light toward an object, said projecting means being capable of selectively projecting a first type of light which flashes instantaneously for use as a camera exposure light source and a second type of light which flashes for a prolonged period of time for use as a camera exposure light source, the intensity being maintained constant during the prolonged period of time;
    means for receiving a first signal from the camera; and
    means responsive to said first signal for switching said projecting means between a first mode to project said first type of light and a second mode to project said second type of light.

2. A photographic system for flash photography with a camera comprising:
    means for projecting an artificial light towards an object, said projecting means being capable of selectively projecting a first type of light which flashes instantaneously and a second type of light which flashes for a prolonged period of time, the intensity being maintained constant during the prolonged period of time;
    means for receiving a first signal from the camera; and
    means responsive to said first signal for switching said projecting means between a first mode to project said first type of light and a second mode to project said second type of light,
    wherein said first signal relates to the exposure time of the camera, and wherein said switching means includes means for selecting said first type of light when the exposure time is greater than a standard and for selecting said second type of light when the exposure time is less than the standard.

3. A photographic system as claimed in claim 2, wherein said intensity of the second type of light is previously determined.

4. A photographic system as claimed in claim 2, further comprising means for receiving a second signal produced from the camera in relation to the shutter operation, and means for terminating the period of time for projecting said second type of light in response to said second signal.

5. A photographic system as claimed in claim 2, further comprising means for determining the period of time for projecting said second type of light between a moment of time corresponding to the beginning of the shutter opening operation and a moment of time corresponding to the completion of the shutter closing operation.

6. A photographic system as claimed in claim 2, further comprising means for controlling the intensity of said projected second type of light.

7. A photographic system as claimed in claim 6, wherein said intensity controlling means includes means for determining the intensity of the projected second type of light so that an intensity of the second type of light reflected from the object is at a predetermined value.

8. A photographic system as claimed in claim 6, wherein said intensity controlling means is responsive to said first signal from the camera.

9. A photographic system as claimed in claim 6, wherein said intensity controlling means includes means for determining the intensity of the projected second type of light so that a total quantity of the second type of light to be effectively reflected from the object during the exposure time is at a predetermined value.

10. A photographic system as claimed in claim 6, wherein said intensity controlling means includes means for adjusting the intensity of said second type of light to be projected, means for receiving the second type of light reflected from the object and for detecting its intensity, and means for governing said adjusting means in response to said receiving and detecting means.

11. A photographic system as claimed in claim 6, wherein said intensity controlling means includes means for determining the intensity of the projected second type of light so that a total intensity of light coming from the object is at a predetermined value.

12. A photographic system as claimed in claim 2, further comprising a focal plane shutter having a leading curtain and a trailing curtain, wherein said standard for the switching means is a time necessary for the leading curtain to complete the travel thereof.

13. An exposure system for a camera comprising:
    means for projecting an artificial light of prolonged flash light having a constant intensity for at least a period of time between a moment of time corresponding to the beginning of the shutter opening operation and a moment of time corresponding to the completion of the shutter closing operation;
    a focal plane shutter having a leading curtain and a trailing curtain;
    an objective lens having a diaphragm aperture;
    means for receiving light which has been reflected from an object, entering through the objective lens and reflected on the leading curtain or camera film, the light including at least the projected prolonged flash light; and
    means for controlling the timing to start the trailing curtain in response to said receiving means.

14. An exposure system as claimed in claim 13, further comprising means for initiating the projection of the prolonged flash light in relation to the starting of the leading curtain and means for terminating the projection of the prolonged flash light in relation to the completion of the travel of the trailing operation.

15. An exposure system as claimed in claim 14, wherein said projecting means is further capable of projecting an artificial light of an instantaneous flash light, and the exposure system further comprises means for initiating the projection of the instantaneous flash light in relation to the completion of the travel of the leading curtain.

16. An exposure system as claimed in claim 15 further comprising means for terminating the projection of the instantaneous flash light in relation to the starting of the trailing curtain.

17. An exposure system for a camera comprising:
means for projecting an artificial light of prolonged flash light having a constant intensity for at least a period of time between a moment of time corresponding to the beginning of the shutter opening operation and the moment of time corresponding to the completion of the shutter closing operation;
a focal plane shutter having a leading curtain and a trailing curtain;
an objective lens having a diaphragm aperture;
means for receiving light which has been reflected from an object, entering through the objective lens and reflected on the leading curtain or camera film, the light including at least the projected prolonged flash light; and
means for controlling the timing to start the trailing curtain in response to said receiving means;
further comprising means for initiating the projection of the prolonged flash light in relation to the starting of the leading curtain and means for terminating the projection of the prolonged flash light in relation to the completion of the travel of the trailing curtain;
wherein said projecting means is further capable of projecting an artificial light of an instantaneous flash light, and the exposure system further comprises means for initiating the projection of the instantaneous flash light in relation to the completion of the travel of the leading curtain;
further comprising means for terminating the projection of the instantaneous flash light in relation to the starting of the trailing curtain;
further comprising means for switching said projecting means between a first mode wherein said instantaneous flash light is projected and a second mode wherein said prolonged flash light is projected in response to whether or not the exposure time is greater than a standard time necessary for the leading curtain to complete the travel thereof, respectively.

18. A photographic system for flash photography with a camera comprising:
means for projecting an artificial flash light durable with a controllable intensity for a period of time, so as to illuminate an object to be photographed upon real exposure;
means for receiving light reflected from said object throughout said period of time; and
means for controlling the intensity of said projected artificial light in response to said receiving means.

19. A photographic system as claimed in claim 18, wherein said intensity controlling means includes means for determining the intensity of the projected artificial light so that an intensity of the artificial light reflected from an object is at a predetermined value.

20. A photographic system as claimed in claim 18, wherein said intensity controlling means includes means for determining the intensity of the projected artificial light so that a total intensity of light coming from the object is at a predetermined value.

21. A photographic system as claimed in claim 18, wherein said intensity controlling means includes means for determining the intensity of the projected artificial light so that a total quantity of said artificial light to be reflected from the object during a given exposure time is at a predetermined value.

22. An exposure system for a camera comprising:
means for projecting an artificial light of prolonged flash light having a durable intensity for a period of time, the intensity being maintained constant during the period of time;
and means for controlling the intensity of said projected artificial light;
wherein said intensity controlling means includes means for determining the intensity of the projected artificial light so that an intensity of the artificial light reflected from an object is at a predetermined value;
further comprising means for measuring the intensity of an ambient light already existing in the objective field, means for calculating the total intensity of light coming from the object in response to the predetermined value for the reflected intensity of the artificial light and to the measured intensity of the ambient light, means for setting the information of film speed, and means for controlling the exposure in response to said total intensity and said information of film speed.

23. An exposure system as claimed in claim 22, further comprising means for setting the aperture size, wherein said exposure controlling means includes means for controlling the exposure time in response to said aperture size, said total intensity and said information of film speed.

24. An exposure system for a camera comprising:
means for projecting an artificial light of prolonged flash light having a durable intensity for a period of time, the intensity being maintained constant during the period of time; and
means for controlling the intensity of said projected artificial light;
wherein said intensity controlling means includes means for determining the intensity of the projected artificial light so that an intensity of the artificial light reflected from an object is at a predetermined value;
further comprising means for measuring the intensity of an ambient light already existing in the objective field, means for calculating the total intensity of light coming from the object in response to the predetermined value for the reflected intensity of the artificial light and to the measured intensity of the ambient light, means for setting the information of film speed, and means for controlling the exposure in response to said total intensity and said information of film speed;
further comprising means for setting an exposure time, wherein said exposure controlling means includes means for controlling the aperture size in response to said exposure time, said total intensity and said information of film speed.

25. An exposure system for a camera comprising:
means for projecting an artificial light of prolonged flash light having a durable intensity for a period of time, the intensity being maintained constant during the period of time;
and means for controlling the intensity of said projected artificial light;
wherein said intensity controlling means includes means for determining the intensity of the projected artificial light so that a total quantity of said artificial light to be reflected from the object during the exposure time is at a predetermined value;

further comprising means for measuring an intensity of the ambient light already existing in the objective field, means for setting the information of film speed, and means for controlling the exposure in response to said total quantity of the reflected artificial light, said measured intensity of ambient light and said information of film speed.

26. An exposure system as claimed in claim 25, further comprising means for setting the aperture size, wherein said exposure control means includes means for controlling the exposure time in response to said aperture size, said total quantity of the reflected artificial light, said measured intensity of ambient light and said information of film speed.

27. An exposure system for a camera comprising:
   means for projecting an artificial light of prolonged flash light having a durable intensity for a period of time, the intensity being maintained constant during the period of time; and
   means for controlling the intensity of said projected artificial light;
   wherein said intensity controlling means includes means for determining the intensity of the projected artificial light so that a total quantity of said artificial light to be reflected from the object during the exposure time is at a predetermined value;
   further comprising means for measuring an intensity of the ambient light already existing in the objective field, means for setting the information of film speed, and means for controlling the exposure in response to said total quantity of the reflected artificial light, said measured intensity of ambient light and said information of film speed;
   further comprising means for setting the exposure time, wherein said exposure controlling means includes means for controlling the aperture size in response to said total quantity of the reflected artificial light, said exposure time, said information of film speed and said measured intensity of ambient light.

28. An exposure system for a camera comprising:
   means for projecting an artificial light of prolonged flash light having a durable intensity for a period of time, the intensity being maintained constant during the period of time; and
   means for controlling the intensity of said projected artificial light;
   further comprising means for measuring the intensity of an ambient light already existing in the objective field, means for setting the information of film speed, and means for controlling the exposure in response to the controlled intensity of said artificial light, said measured intensity of ambient light and said information of film speed.

29. An exposure system as claimed in claim 28, wherein said intensity controlling means includes means for determining the intensity of the projected artificial light so that an intensity of the artificial light reflected from an object is at a predetermined value, and wherein said exposure controlling means is responsive to said predetermined value for the reflected intensity of the artificial light, said measured intensity of ambient light and said information of film speed.

30. An exposure system as claimed in claim 29, further comprising means for setting one of the aperture size and the exposure time, wherein said exposure controlling means includes means for controlling the other of the aperture size and the exposure time in response to said predetermined value for the reflected intensity of the artificial light, said measured intensity of ambient light, said information of film speed and said set one of the aperture size and the exposure time.

31. A photographic system for flash photography with a camera comprising:
   means for projecting an artificial light toward an object, said projecting means being capable of selectivity projecting a first type of light which flashes instantaneously for use as a camera exposure light source and a second type of light which flashes for at least a period of time between a moment corresponding to the beginning of the shutter opening operation and a moment of time corresponding to the completion of the shutter closing operation for use as a camera exposure light source, the intensity of the second type of light being maintained during the period of time;
   means for switching said projecting means between a first mode to project said first type of light and a second mode to project said second type of light.

32. A photographic system as claimed in claim 31, further comprising means for initiating the projection of the second type of light in relation to the beginning of the shutter opening operation.

33. A photographic system as claimed in claim 32, further comprising means for terminating the projection of the second type of light in relation to the completion of the shutter closing operation.

* * * * *